(12) United States Patent
Wan et al.

(10) Patent No.: US 7,616,590 B2
(45) Date of Patent: Nov. 10, 2009

(54) DISTRIBUTED TEMPERO-SPATIAL QUERY SERVICE

(75) Inventors: Ming Wan, Sammamish, WA (US); Paul Murray, Woodenville, WA (US); Charles A Erignac, Seattle, WA (US)

(73) Assignee: The Boeing Company, Chicago, IL (US)

( * ) Notice: Subject to any disclaimer, the term of this patent is extended or adjusted under 35 U.S.C. 154(b) by 691 days.

(21) Appl. No.: 11/191,625

(22) Filed: Jul. 28, 2005

(65) Prior Publication Data

US 2007/0041336 A1 Feb. 22, 2007

(51) Int. Cl.
*H04L 12/28* (2006.01)
(52) U.S. Cl. .................................. 370/256; 707/10
(58) Field of Classification Search ................ 370/256, 370/408; 707/10
See application file for complete search history.

(56) References Cited

U.S. PATENT DOCUMENTS

| | | | | |
|---|---|---|---|---|
| 5,699,351 | A * | 12/1997 | Gregerson et al. | 370/256 |
| 6,201,801 | B1 * | 3/2001 | Dent | 370/342 |
| 6,259,452 | B1 * | 7/2001 | Coorg et al. | 345/421 |
| 6,779,060 | B1 | 8/2004 | Azvine et al. | |
| 6,782,346 | B2 | 8/2004 | Bond et al. | |
| 6,791,452 | B2 | 9/2004 | Fletcher et al. | |
| 7,117,273 | B1 * | 10/2006 | O'Toole et al. | 709/252 |
| 2002/0099690 | A1 * | 7/2002 | Schumacher | 707/1 |

OTHER PUBLICATIONS

Becker, B., Gschwind, S., Ohler, T., Seeger, B., and Widmayer, P., "An Asymptotically Optimal Multiversion B-Tree," The International Journal on Very Large Data Bases, vol. 5, Issue 4 (Dec. 1996), pp. 264-275.

Beckmann, N., Kriegel H., Schneider, R., and Seeger, B., "The R*-tree: An Efficient and Robust Access Method for Points and Rectangles+," SIGMOD (Special Interest Group on Management of Data), pp. 322-331, 1990.

Brinkoff, T., Horn, H., Kriegel, H.P., and Schneider, R., "A Storage and Access Architecture for Efficient Query Processing in Spatial Database Systems," Proc. 3rd Symposium on Large Spatial Databases, Singapore, 1993.

De Floriani, L., Marzano, P., and Puppo, E., "Spatial Queries and Data Models," In A. Frank & I. Campari (Eds). Spatial Information Theory: A Theoretical Basis for GIS. Berlin: Springer-Verlag, 1993.

Hadjieleftheriou, M., Kollios, G., Tsotras, V., and Gunopulos, D., "Efficient Indexing of Spatiotemporal Objects," EDBT (Extending Database Technology), 2002.

Kollios, G., Gunopulos, D., Tsotras, V., Delis, A., and Hadjieleftheriou, M., "Indexing Animated Objects Using Spatiotemporal Access Methods," IEEE (Institute of Electrical and Electronics Engineers, Inc.) Transactions on Knowledge and Data Engineering, v. 13 n. 5, p. 758-777, Sep. 2001.

(Continued)

*Primary Examiner*—Dang T Ton
*Assistant Examiner*—Kevin Lee
(74) *Attorney, Agent, or Firm*—Harness, Dickey & Pierce, P.L.C.

(57) ABSTRACT

A distributed tempero-spatial query service uses a plurality of service agents each having an assigned area of responsibility. The service agents are organized into a spatial hierarchy based upon each service agent's area of responsibility. The spatial hierarchy is distributed and hosted on each of the service agents. The spatial hierarchy enables matching of requests from subscribing agents with publishing agents based upon spatial attributes. The spatial hierarchy is dynamically maintained in a distributed manner on each of the service agents. The service agents can be arranged into a tree-based spatial hierarchy having a limited depth.

14 Claims, 14 Drawing Sheets

OTHER PUBLICATIONS

Orenstein, J.A., "Spatial Query Processing in an Object-Oriented Database System," Proceedings of the 1986 ACM SIGMOD (Association for Computing Machinery—Special Interests Group on Management of Data) international conference on Management of data, Washington, D.C., United States, pp. 326-336, 1986.

Saltenis, S. and Jensen, C., "Indexing of Moving Objects for Location-Based Services," ICDE (International Council for Open and Distance Education), 2002.

Salzberg, B. and Tsotras, V., "A Comparison of Access Methods for Time Evolving Data," ACM (Association for Computing Machinery) Computing Survey, 31(2): 158-221, 1999.

Tao, Y. and Papadias, D., "Spatial Queries in Dynamic Environments," ACM (Association for Computing Machinery) Transactions on Databases Systems (TODS), 28(2): 101-139, 2003.

Tayeb, J., Ulusoy, O., and Wolfson, O., "A Quadtree Based Dynamic Attribute Indexing Method," The Computer Journal, 41(3):185-200, 1998.

Truffet, D. and Orlowska, M., "Two Phase Query Processing with Fuzzy Approximations," Proceedings of the 4th ACM (Association for Computnig Machinery) international workshop on Advances in geographic information systems, pp. 84-89, Rockville, Maryland, United States, Nov. 1996.

Vazirgiannis, M., Theodoridis, Y., and Sellis, T., "Spatio-Temporal Composition and Indexing for Large Multimedia Applications," Multimedia Systems, 6(4):284-298, 1998.

* cited by examiner

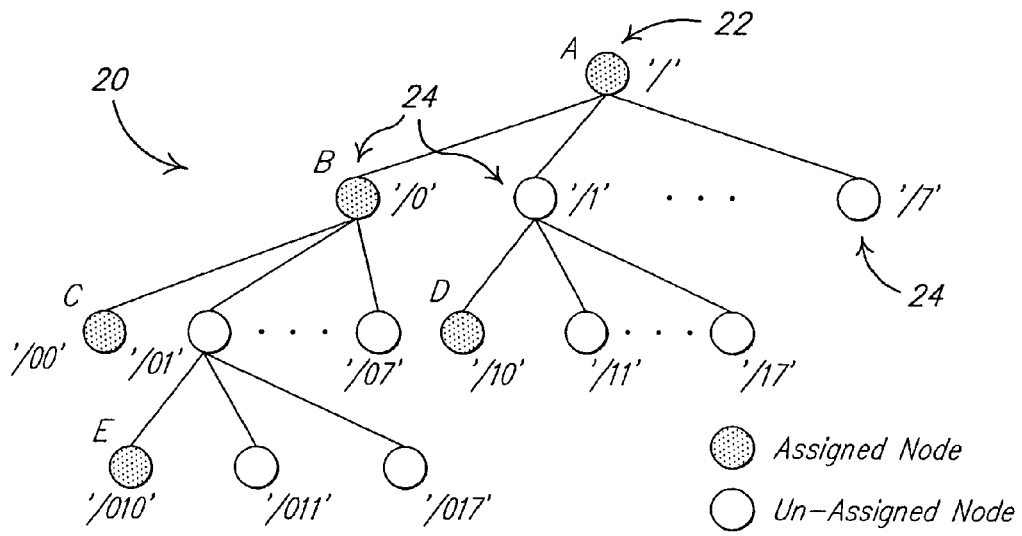
FIG. 1A.
| Agent ID | AOR Node |
|---|---|
| A | '/' |
| B | '/0' |
| C | '/00' |
| D | '/10' |
| E | '/010' |
FIG. 1B.
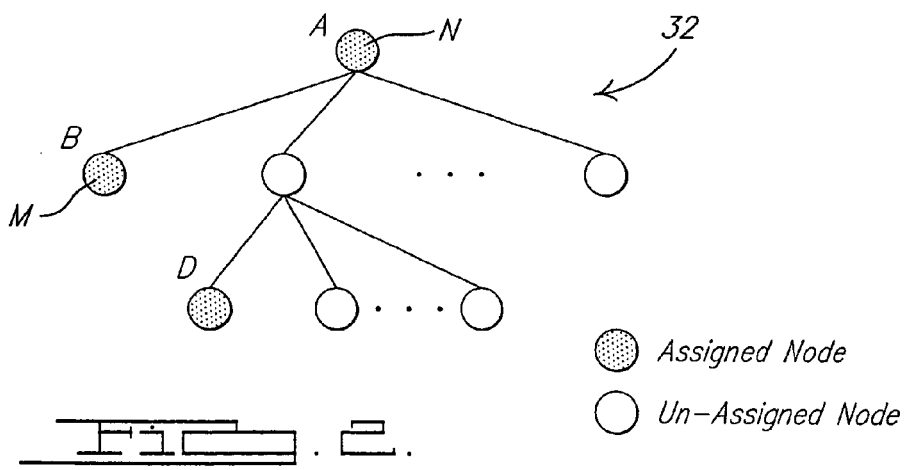
FIG. 2.

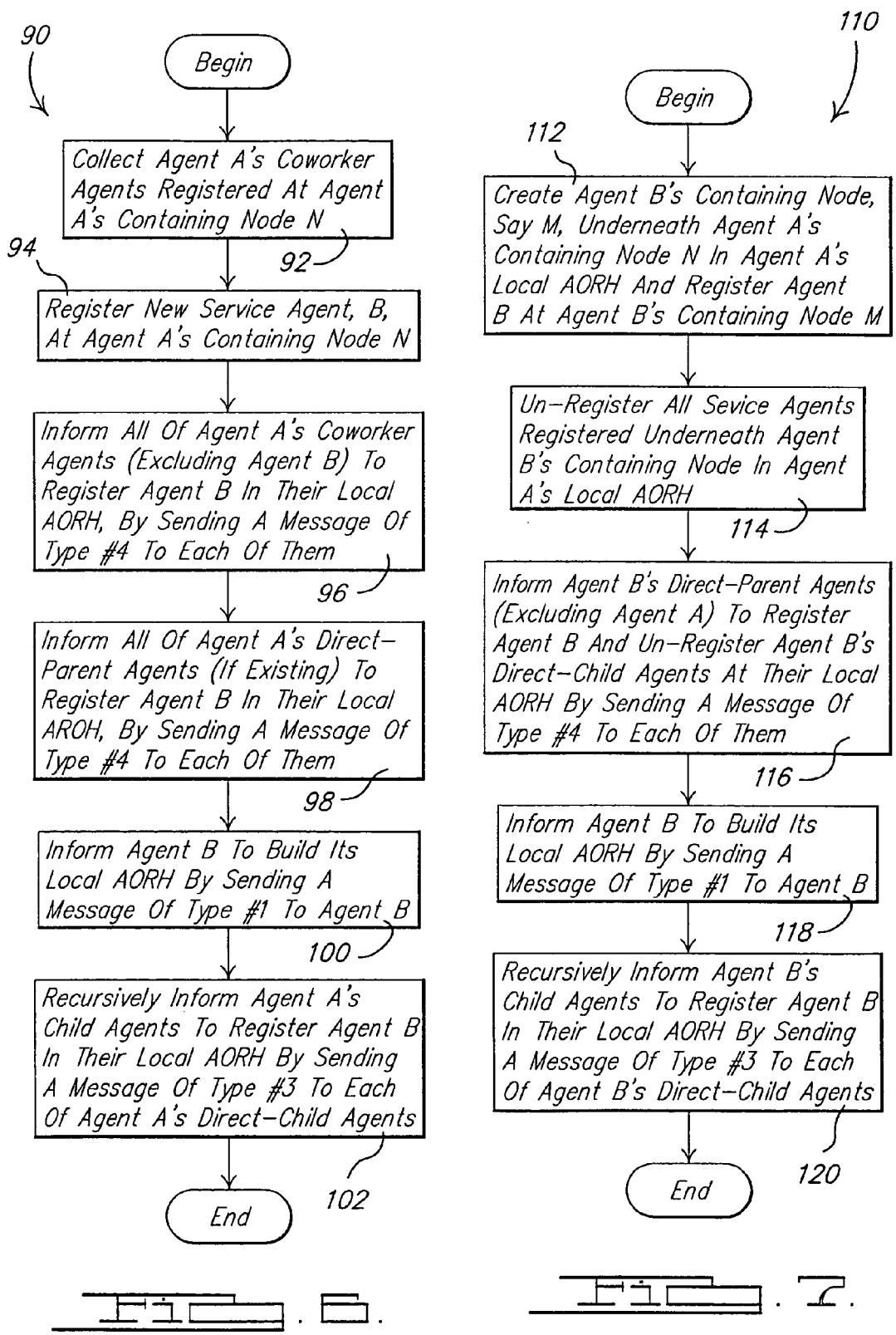

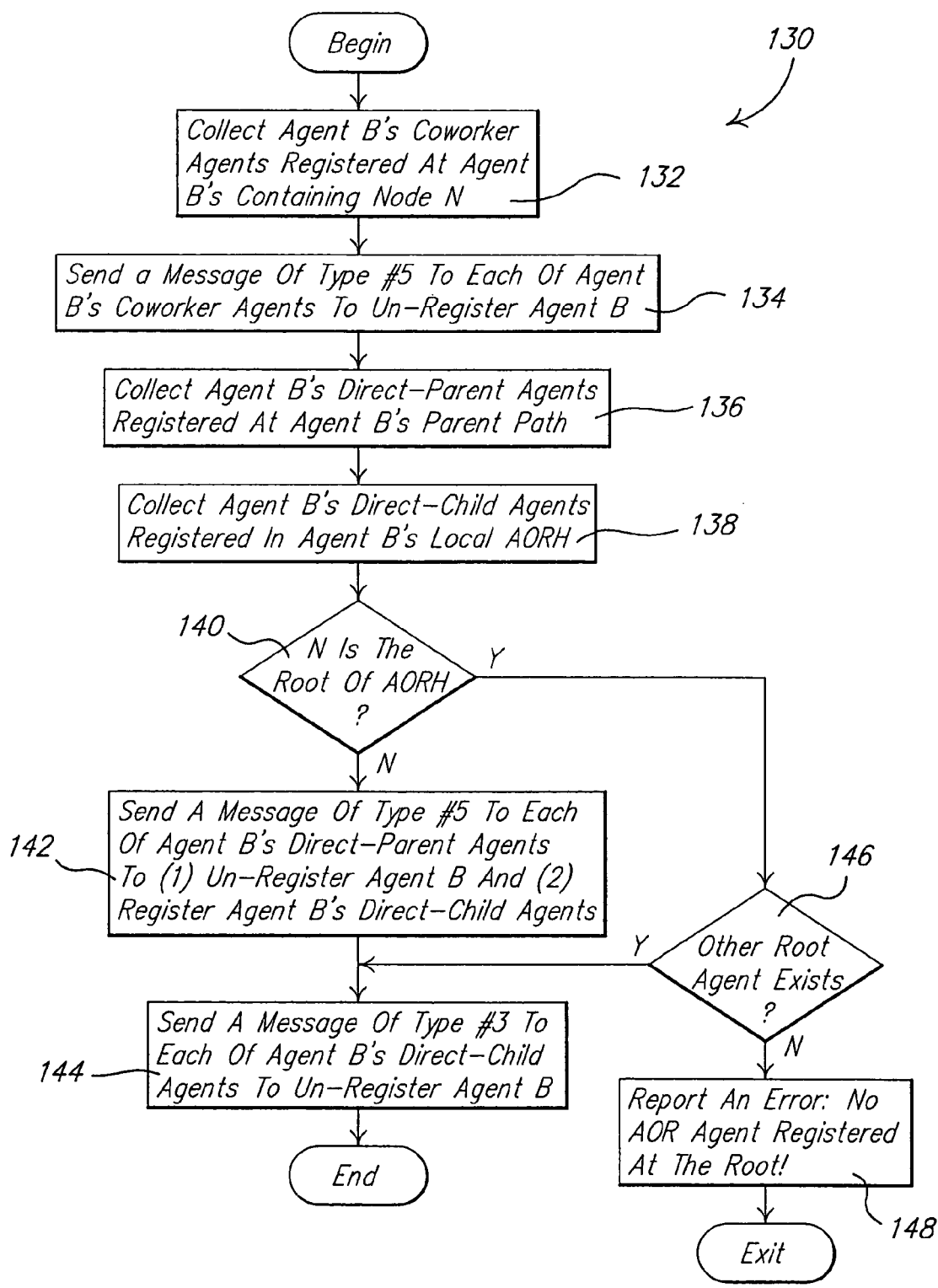

DISTRIBUTED TEMPERO-SPATIAL QUERY SERVICE

FIELD OF THE INVENTION

The present invention relates to distributed system architectures and, more particularly to a distributed tempero-spatial query service.

BACKGROUND OF THE INVENTION

Directory services form the basis of some distributed system architectures. These systems, however, have drawbacks that limit the usefulness. One drawback is that the systems are largely centralized. The centralized nature limits the robustness of the system. For example, in a centralized system a single point of failure can result in shutting down the entire system. Another drawback is that these systems may lack scalability. For example, the system may not be capable of adding and removing service agents to change the scale of the distributed system. These drawbacks limit the applications in which these distributed system architectures can be utilized.

Accordingly, it would be advantageous to provide a distributed system architecture that eliminates or reduces these drawbacks. Providing a more robust system would advantageously increase the reliability. Incorporating scalability into the system would allow it to be adjusted to meet changing needs. These additional capabilities would enable distributed system architectures to be advantageously utilized in new/additional applications.

SUMMARY OF THE INVENTION

The present invention provides a tempero-spatial query service (hereinafter "the Service") using a distributed system architecture that eliminates and/or reduces the above-described drawbacks. The Service uses a peer-to-peer architecture that provides service decentralization and parallel query processing. This peer-to-peer architecture increases robustness, scalability and performance. The Service assigns areas of responsibility (AORS) to various service agents. The AORs of the service agents are arranged into a hierarchy that allows consumer agents (users) efficient access to the service agent having an AOR that encompasses or intersects an area of interest (AOI). The hierarchy is dynamic and maintained in a repository that is distributed through and hosted by the service agents. The Service is operable to match a request from a consumer agent regarding a particular AOI with sensor agent(s) (agents having sensors operable to provide information about a volume of space and objects therein) having areas of coverage (AOC) (the volume of space within which the sensor agent's sensors are effective) that are encompassed by or intersect with the AOI. This matching is done based upon the spatial attributes of both the AOI and the AOC.

The Service offers both publication and subscription services. The Service allows the service agents to publish information (publication services) on objects which are indexed based on their geometric and spatial attributes, as provided by the sensor agent(s). These objects describe real and abstract entities in a multi-agent system world view. Consumer agents can access the published information. The indexing based upon spatial attributes facilitates identifying relevant publications for a particular consumer agent.

The Service also allows the service agents to provide subscription services in response to requests (queries) from consumer agents. The subscription services include both snapshot requests and life-cycle constrained requests. In response to a snapshot request the relevant service agent(s) provide a snapshot of the AOI or object(s) of interest (as determined based upon the specific request of a consumer agent) at a distinct moment in time. In response to a life-cycle constrained request the relevant service agent(s) provide a dynamically changing view of the AOI or object(s) of interest (as determined based upon the specific request of a consumer agent) for the duration of the life-cycle. The service agent(s) either relay the relevant information or direct the consumer agent to the appropriate sensor agent(s) to obtain the requested information.

In one aspect of the invention, a method of matching a publishing agent's area of coverage with a subscribing agent's area of interest using a distributed tempero-spatial query service is disclosed. The method includes: (1) assigning areas of responsibility (AORs) to a plurality of service agents; (2) organizing the service agents into a spatial hierarchy based upon each service agent's AOR; (3) distributing and hosting the spatial hierarchy on each of the service agents; and (4) matching a request from a subscribing agent with a publishing agent based upon spatial attributes.

In another aspect of the present invention, a method of operating a tempero-spatial query service is disclosed. The method includes: (1) assigning areas of responsibility to a plurality of service agents; (2) organizing the service agents into a spatial hierarchy based upon each service agent's area of responsibility; and (3) processing multiple requests from subscribing agents in parallel with the service agents.

In yet another aspect of the present invention, another method of operating a tempero-spatial query service is disclosed. The method includes: (1) assigning areas of responsibility to a plurality of service agents; (2) organizing the service agents into a spatial hierarchy (AORH) based upon each service agent's area of responsibility; (3) distributing and hosting the spatial hierarchy on each of the service agents; and (4) dynamically maintaining the distributed AORH hosted on each of the service agents.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein:

FIG. 1A is a representation of the area of responsibility hierarchy used in the Service according to the principles of the present invention;

FIG. 1B is an exemplary assignment table used to establish the area of responsibility hierarchy of FIG. 1A;

FIG. 2 is an exemplary local area of responsibility hierarchy tree for a particular service agent;

FIG. 6 is a flowchart of the function RegisterServiceAgentAtSubRoot( ) used by the Service;

FIG. 7 is a flowchart of the function RegisterServiceAgentUnderSubRoot( ) used by the Service;

FIGS. 8A-8E are schematic representations showing the addition of a new service agent into the area of responsibility hierarchy of the Service;

FIG. 9 is a flowchart of the Dynamic AORH Maintenance Algorithm—Remove an Existing Service Agent used by the Service;

FIG. 16 is a flowchart of the Distributed Consumer Registration Algorithm used by the Service.

DETAILED DESCRIPTION OF THE PREFERRED EMBODIMENT

Figure 3:
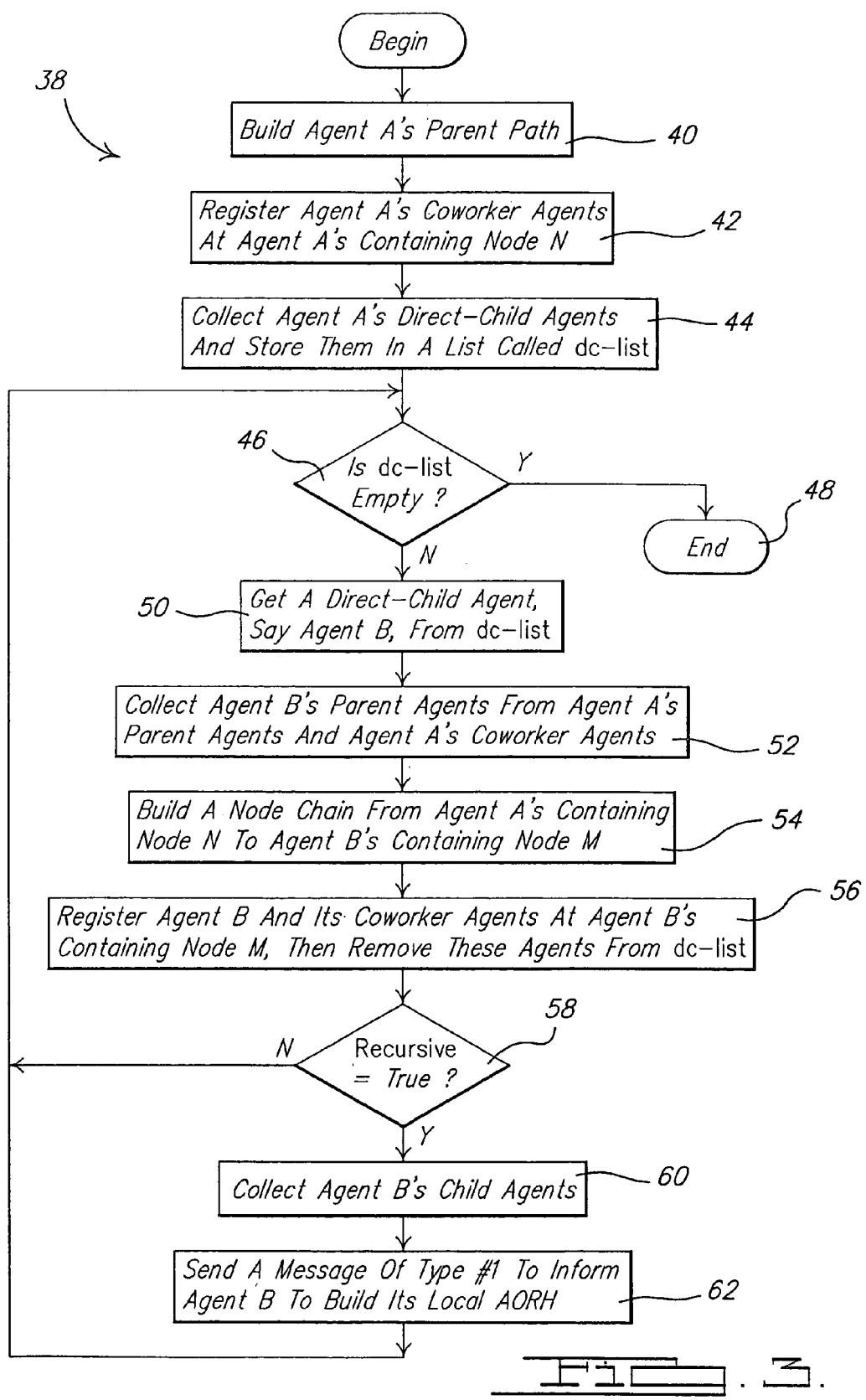
FIG. 3 is a flowchart of the function BuildLocalTreeFromAssignmentTable( ) used by the Service.

The following description of the preferred embodiment is merely exemplary in nature and is in no way intended to limit the invention, its application, or uses. As used herein, the term "module" refers to an application specific integrated circuit (ASIC), an electronic circuit, a processor (shared, dedicated or group) and memory that execute one or more software or firmware programs, a combinational logic circuit, or other suitable components that provide the described functionality.

The present invention is a distributed tempero-spatial query service, hereinafter referred to as the "Service." The Service is described herein relative to an exemplary physical application of the Service in order to facilitate understanding of the present invention. For example, the Service is discussed relative to various agents having particular properties. It should be appreciated, however, that the physical application is merely exemplary and that the Service can be implemented in other applications. Such applications include, but are not limited to, those which exist in dynamically changing and possibly adversarial environments where mobile and static agents must form ad-hoc teams through peer discovery. By way of non-limiting examples, such applications may include military operations utilizing a variety of manned and unmanned vehicles requiring opportunistic team formation as well as civilian search and rescue operations in response to natural disasters.

The Service utilizes a distributed system architecture that is distributed throughout and hosted on a plurality of service agents. The Service provides information about a defined three-dimensional volume of space, as described below. The defined three-dimensional space can be the entire world or limited to a specific portion of the world, or outer space. The defined three-dimensional space is organized into a plurality of areas of responsibility (AORs). Each service agent is assigned an AOR that represents a cubic volume of space. The AORs of each service agent may be fully contained by, identical to, or have an empty intersection with the AORs of other service agents. The AORs of each service agent can be static or dynamic, as described below. The Service organizes the service agents into an octree-based spatial hierarchy, known as area of responsibility hierarchy (AORH). The AORH is represented in an octree with a limited depth. The root of the AORH covers the entire defined three-dimensional space. At least one service agent is assigned an AOR corresponding to the root of the AORH, so that a spatial query can cover the entire defined three-dimensional space. This ensures a fast and complete spatial query with requested accuracy. The AORH is distributed throughout and hosted on the service agents. The Service advises a consumer agent (user/seeker of information for a particular geometric entity (GE) or area of interest (AOI)) of the appropriate service agent (the service agent whose AOR covers and/or intersects the AOI of the consumer agent) to communicate with to obtain the information desired by the consumer agent, as described below.

Each service agent has a unique identification and has certain capabilities to function as a service agent in the Service. Specifically, each service agent has a communications module that allows the service agent to communicate with other service agents, with consumer agents, and with sensor agents (agents having sensors that can provide information about time varying three-dimensional geometric entities (GEs) within the sensor's area of coverage (AOC)). Each service agent also has a processing module that enables the service agent to host, access, and dynamically update the AORH. Additionally, the processing module also enables the service agent to match an AOI of a consumer agent with the appropriate service agent(s) based upon the AORH. The processing module also enables the service agent to provide (either relaying or synthesizing) information regarding the AOCs available (the location, the velocity, and/or the shape and field of regard of a sensor agent(s)' sensor(s)) and/or about the GE(s) in the AOI to the consumer agent. The service agents may, optionally, have a sensor module that allows a service agent to sense or detect information about GE(s) within the sensor(s)' AOC, thereby enabling the service agent to act as both a service agent and a sensor agent. Moreover, a service agent may also act as a consumer agent. Thus, a service agent may act as a sensor agent, a consumer agent or both in addition to functioning as a service agent.

Each service agent can be static or dynamic. A static service agent is fixed in a particular physical location during operation of the Service. For example, a service agent can be part of a fixed building or structure or part of a command location that is fixed in position during operation of the Service. A dynamic service agent is mobile and has a position that can vary during operation of the Service. For example, a service agent can be part of a vehicle, aircraft, drone, ship, satellite, etc. Additionally, service agents can enter into and exit the Service at any time.

The AOR of a service agent is dynamic. The AOR of a service agent can be removed, changed or reassigned according to the service agent's suitability to fulfill those responsibilities. For example, a service agent may have its AOR removed when the service agent is destroyed, impaired or physically relocated to a non-relevant position, such as when refueling or retired from operation. A service agent's AOR can also change or be reassigned when the service agent moves to a new physical location or its capabilities have changed or are impaired. Additionally, new service agents can be added to the Service based upon their availability and capabilities. The adding of new service agents can result in the AORs of existing service agents to be changed based upon the new service agents being added to the Service.

Each sensor agent has certain capabilities to access the Service. Specifically, each sensor agent has a communications module that allows the sensor agent to communicate with the service agents and with the consumer agents. Each sensor agent also has a sensor module that includes one or more sensors each having an AOC defined by the capabilities of the particular sensor(s). The sensor module is operable to detect and monitor GEs within its AOC. Each sensor agent informs the Service, via communication with the service agents, about various attributes of itself and/or of what is being detected and/or monitored by its sensor(s). For example, each sensor agent may inform the Service of its location, its velocity, and/or the shape and field of regard of its sensor(s). Each sensor agent can also inform the Service of the GE's it is detecting and/or monitoring with its sensor(s). Each sensor agent can also advise the Service whenever a GE of interest appears within its AOC. The sensor agents may also be capable of directly communicating (when within range) with consumer agents to provide requested information directly to the consumer agents. The sensor agents may also act as service agents and/or consumer agents depending upon each agent's capabilities and intended purpose. The sensor agent(s) may be fixed in position or mobile.

Each consumer agent has certain capabilities to access and use the Service. Specifically, each consumer agent has a communications module that allows the consumer agent to communicate with service agents and with sensor agents. Each consumer agent also has a processing module that enables the consumer agent to access and use the information provided by the service agents and/or sensor agents. The consumer agents may, optionally, have a sensor module that allows a consumer agent to sense or detect information about GE(s) within the sensor(s)' AOC, thereby enabling the consumer agent to act as both a consumer agent and a sensor agent. Moreover, a consumer agent may also act as a service agent depending upon its capabilities. Consumer agents can be fixed in location or mobile.

The consumer agents can use the Service to access various types of information. A consumer agent can make the initial request or query to any service agent currently accessible with the communications module. The type of information requested by the consumer agents can vary and can be for a particular point in time or constrained to a particular period of time or life-cycle. For example, a consumer agent may desire to know which sensor agents have sensors that are operable on a particular AOI. The consumer agents may desire to know what GEs are currently being sensed in a particular AOI and what the GE's attributes are at that particular time (a snapshot subscription). Alternately, the consumer agents may desire to know the GE's attributes over a particular time period or life-cycle (a life-cycle subscription). Additionally, a consumer agent may desire to be informed when a particular group or type of GEs enters into the AOI or when information about the group or types of GEs is available for a particular life-cycle. Moreover a consumer agent, in the case of a mobile consumer agent, may have a flight or travel plan and desire to know which sensor agent(s) have information on any spatial portion of the flight/travel plan (a life-cycle subscription with the flight/travel plan being the life-cycle). The consumer agents can also request information being published by the sensor agent(s) for a particular AOI. It should be appreciated that the preceding descriptions of the types of information that can be requested by consumer agents is merely exemplary in nature and that other types of information may be requested of and supported by the Service.

The Service has various functionalities to support the different types of requests that can be made by the consumer agents and facilitate fulfillment of the requests. Firstly, the Service facilitates the discovery of sensor agents having information desired by a consumer agent based upon the spatial attributes (AOI) of the request by the consumer agent and the AORs of the service agents. The Service acts as a repository or clearinghouse (distributed and hosted on each service agent) for the information being provided by the sensor agents. The Service indexes the information provided by the sensor agents based upon spatial attributes. Based upon a request from a consumer agent, the Service provides the consumer agent with the appropriate service agent to communicate with to obtain the requested information. The appropriate service agent has an AOR that encompasses the AOI (the spatial attributes of the request) of the consumer agent. That is, the Service matches the spatial attributes of the request with the spatial responsibilities of the service agents to provide the consumer agent with the identification of the service agent(s) that is responsible for the AOI of the request. The consumer agent can then communicate with the appropriate service agent and obtain the requested information from that service agent or from particular sensor agent(s) identified by that service agent. Thus, the use of spatial attributes facilitates the matching of a request from a consumer agent with the appropriate service agent and/or sensor agent.

Secondly, the Service facilitates the quick and efficient access to the requested information by the consumer agent. The Service selects the appropriate service agent to communicate with the consumer agent based on the AORH. Specifically, the Service identifies the service agent that is furthest down (lowest level) the spatial hierarchy whose AOR encompasses the AOI. The use of the lowest level service agent possible reduces the number of intermediaries with which the consumer agent interacts to obtain the requested information. Additionally, the use of the lowest level service agent possible also frees up other (higher and lower level) service agents to respond to requests from other consumer agents. These features enable the Service to process requests from multiple consumer agents in parallel using the processing capabilities on the various service agents. Thus, the use of the AORH to ascertain the appropriate lowest level service agent increases the efficiency and speed of the Service and enables parallel processing of the consumer agent requests.

Thirdly, the Service is easily scalable to add or remove service agents as they become available or unavailable. Additionally, the Service can reassign the AOR of an existing service agent based upon its suitability to fulfill those responsibilities. The Service uses algorithms to add/remove/reassign the AORs of the service agents. The algorithms gracefully initiate a new determination of the AORH by each service agent, as described below. The scalability advantageously allows the Service to be dynamic and utilize all the available service agents to provide information to the consumer agents.

Fourthly, the Service is robust. The Service is hosted and distributed on all of the service agents. The distributed nature allows the Service to continue to operate with the failure of one or more of the service agents. The Service removes the failed service agent(s) from the AORH. The Service establishes a new AORH and one or more of the remaining service agents are reassigned to have a new AOR. The new AORH is hosted and distributed on the remaining service agents. This capability advantageously reduces the possibility of the Service being unavailable to a consumer agent.

To enable the various functionalities of the Service, messages are transmitted among the various agents during operation of the Service. The messages are classified into three categories. The first category is for registration or subscription and these messages are sent from sensor agent(s) and/or consumer agent(s) to service agents. The second category is to provide the services or to implement the required services and these messages are sent from service agent(s) to consumer agent(s), sensor agent(s), and other service agent(s).

The third category is for data requests and feeds and these messages are sent between consumer agent(s) and sensor agent(s).

Details of the Service's distributed AORH data structure, generation and maintenance of the AORH, and the distributed publication and subscription of agents according to the principles of the present invention is explained below with reference to a conceptual embodiment. As mentioned before, a plurality of service agents are utilized and the service agents' AORs are organized into an octree-based spatial hierarchy (AORH). Octal encoding is used to represent each node in the AORH. FIG. 1A shows a representative AORH 20 with a limited depth of 4, whose nodes are represented by octal encoding. In the octal encoding scheme, the root node's 22 code would be '/', and the codes for the root's eight child nodes 24 are '/0', '/1', '/7'. In turn, the codes for the child nodes of node '/XXX' are '/XXX 0', '/XXX 1', . . . , '/XXX 7', where X is among 0-7. As a result, each node can be represented by a unique octal code. Because such an octal encoding of a node indicates the path from the root to this node, it may be called a node path.

Referring to FIGS. 1A and 1B, to initiate the Service into operation a plurality of service agents (for example service agents A-E) are each assigned an AOR. The information of the AOR of each service agent is provided in an AOR-assignment table, as shown in FIG. 1B. This table contains a list of service agent IDs (A-E) and their corresponding AORs. The AORs of the service agents are assigned at the beginning of operation of the Service. The AOR's, however, can be dynamically removed, inserted, or reassigned during operation, as mentioned above and as described below.

For implementation simplicity, it is required that an AOR always correspond to the space of volume fully covered by a single node in the AORH 20. For this reason, an AOR is always a cubic volume of space. One AOR can be fully contained by, identical to, or have an empty intersection with another AOR. It is further required that there is at least one service agent assigned an AOR corresponding to the root of AORH 20, so that the spatial query can cover the entire agent environment. In this example, service agent A is assigned the node 22 corresponding to the root of AORH 20. The root agent is responsible to pass the origin, orientation, and extent of the Octree (the volume of the Octree) to all service agents when building the D-AORH. If a node of AORH 20 covers a volume of space that is identical to the AOR of a service agent, we call this node an assigned node. If a node is an assigned node, we mark it as ASSIGNED.

The global AORH 20 shown in FIG. 1A is conceptual. In operation of the Service, the actual AORH is distributed and dynamically maintained among all service agents. Each service agent will build and maintain a local AORH, as a component of the global AORH, as shown in FIG. 2. A local AORH tree 32 built on a service agent, say agent A, consists of three components: (1) this service agent's (or called the owner agent's) containing node N, whose corresponding space of volume is identical to agent A's AOR; (2) a parent path from agent A's containing node N towards the root of the conceptual global AORH 20; and (3) a subtree rooted at node N and ending at the first-encountered assigned node along each branch. Node N is called the subroot of agent A's local AORH, and agent A is said to be assigned at node N. FIG. 2 gives an example of the local AORH tree 32 of agent A, where A is registered at the root of the global AORH 20 (shown in FIG. 1A). Agent A is called the root agent. In the local AORH of a root agent, the parent path is empty (NIL). Agents B and D are called direct-child agents of agent A because they are directly underneath A (not through other agents) in the AORH.

Distributed AORH Generation Algorithm

At the beginning of operation of the Service a root agent, say agent A, is designated with an AOR-assignment table and distributed AORHs (called D-AORH) are built in a distributed manner among all service agents, starting from the root agent. The building of the D-AORH for each service agent is done using the D-AORH Generation Algorithm. The D-AORH Generation Algorithm has two parts, one is executed on the root agent, agent A, and the other is executed on other service agents. The core of this algorithm is a function (described below) named BuildLocalTreeFromAssignmentTable( ), which builds a local AORH at a given service agent. Both root agent and non-root agents will call this function to implement their local AORH, as described below.

Function I

BuildLocalTreeFromAssignmentTable( )

This function is designed to build a local AORH at a given service agent. It has five input parameters that provide all the information needed to build a local AORH. The output is a local AORH build at the given service agent. FIG. 3 shows a diagram of function BuildLocalTreeFromAssignment Table( ) 38 with specific reference to building a local AORH for service agent A having a direct-child agent B. It should be understood, however, that this function is used for all service agents to build the local AORH for that service agent and not just for root agents.

Input (5 Input Parameters)

The five input parameters used by function BuildLocalTreeFromAssignmentTable( ) 38 are as follows:

(1) A given service agent, say agent A, and its containing node, say node N;

(2) Agent A's parent agents, i.e. those service agents assigned at the nodes on agent A's parent path (but not including A's containing node N);

(3) Agent A's co-worker agents, i.e., those service agents assigned at A's containing node N;

(4) Agent A's child agents, i.e. those service agents assigned at the nodes in the subtree of AORH rooted at containing node N; and (5) A flag named recursive (if the value of recursive is true, this function needs to further build local AORH at agent A's child agents).

Output

The local AORH of the given service agent A.

Process

The process performed by function BuildLocalTreeFromAssignmentTable( ) 38, as shown in FIG. 3, includes the following procedures:

(1) Build agent A's parent path: generate a node path from agent A's containing node N towards the root of the global AORH; then, register agent A's parent agents at their containing nodes in that path, as indicated in block 40;

(2) Register agent A's co-worker agents at A's containing node N, as indicated in block 42;

(3) Collect agent A's direct-child agents from A's child agents and store them in a list called dc-list, as indicated in block 44;

(4) Check dc-list for empty, as determined in decision block 46;

(5) If dc-list is empty, the algorithm ends, as indicated in block 48;

(6) If dc-list is not empty, as determined in decision block 46, then continue with the algorithm to register each of agent A's direct-child agents at that agent's containing node;

(7) Get a direct-child agent, say agent B, from dc-list, as indicated in block 50;

(8) Generate agent B's parent agents that consist of both agent A's parent agents and agent A's co-worker agents and collect agent B's co-worker agents from agent A's direct-child agents, as indicated in block 52;

(9) Build a node chain from agent A's containing node N to agent B's containing node, say node M, as indicated in block 56;

(10) Register agent B and agent B's co-worker agents at node M and remove these agents from dc-list, as indicated in block 56;

(11) Check value of recursive, as indicated in decision block 58; and

(12) If recursive=true, then collect agent B's child agents from agent A's child agents, as indicated in block 60, and send a message of type #1 to inform agent B to build its local AORH, as indicated in block 62, then check status of dc-list, as indicated in decision block 46. If recursive=false then check status of dc-list, as indicated in decision block 46.

In this preceding example, all five input parameters that agent B needs to build its local AORH had already been collected. In the event all five input parameters were not already collected, the inputs would be collected, as needed, by the processing module and used in the function.

Generate a Root Agent's and Service Agent's Local AORH

Figure 4:
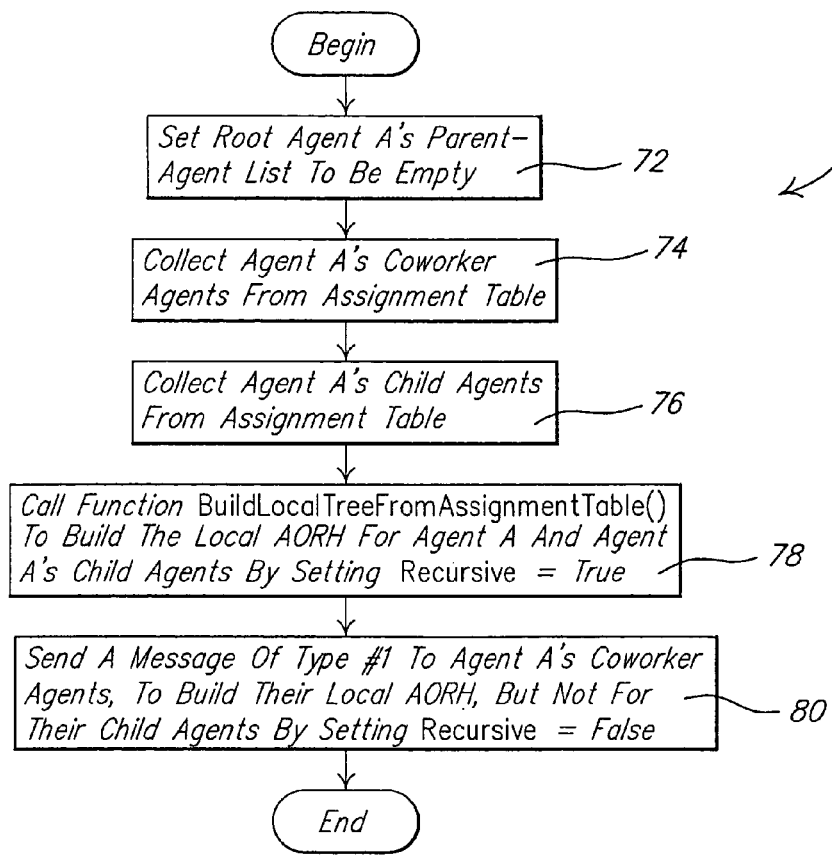
FIG. 4 is a flowchart of the D-AORH Generation Algorithm used by the Service.

Generation of a D-AORH starts from a root agent that is designated with an initial service agent AOR-assignment table T. The first part of the D-AORH Generation Algorithm, as mentioned above, is executed on the root agent, in this example agent A. The second part of the D-AORH Generation Algorithm is executed on the other service agents, such as agent B. To generate a root agent's and the other service agent's local AORHs, the D-AORH Generation Algorithm 70, as shown in FIG. 4, is used. The D-AORH Generation Algorithm 70 is executed in the following manner:

(1) Set root agent's parent-agent list to empty, as indicated in block 72;

(2) Collect the root agent's (agent A's) co-worker agents from the AOR assignment table T, as indicated in block 74;

(3) Collect the root agent's (agent A's) child agents from the AOR assignment table T, as indicated in block 76;

(4) Call function BuildLocalTreeFromAssignmentTable( ) to build the local AORH for the root agent (agent A) and all its child agents, by setting flag recursive to be true, as indicated in block 78; and (5) Send a message of type #1 to each of the root agent's (agent A's) co-worker agent(s), to build their local AORH and set recursive to be false, as indicate in block 80. (Note that because the local AORH of their child agents will be build in procedure (4), above, recursive is set to false to avoid duplicated work on these child agents.)

By executing the procedures in blocks 72-80, the local AORH for the root agent, the root agent's child agents and the root agent's co-worker agents is created. Thus, using D-AORH Generation Algorithm 70 in conjunction with BuildLocalTreeFromAssignmentTable( ) 38, a D-AORH is created by each service agent creating and hosting its own local AORH.

The Service, as stated above, is dynamic and capable of dynamically updating the D-AORH as needed. The D-AORH needs to be updated in three situations: (1) to insert or add a new service agent; (2) to remove or destroy an existing service agent; and (3) to reassign a new AOR to an existing service agent. Such capabilities are useful in the event that a new service agent becomes available, an existing service agent is lost, malfunctions or is destroyed and when the suitability of an existing service agent to perform its responsibilities changes.

Dynamic AORH Maintenance Algorithm

Insert a New Service Agent

Figure 5:
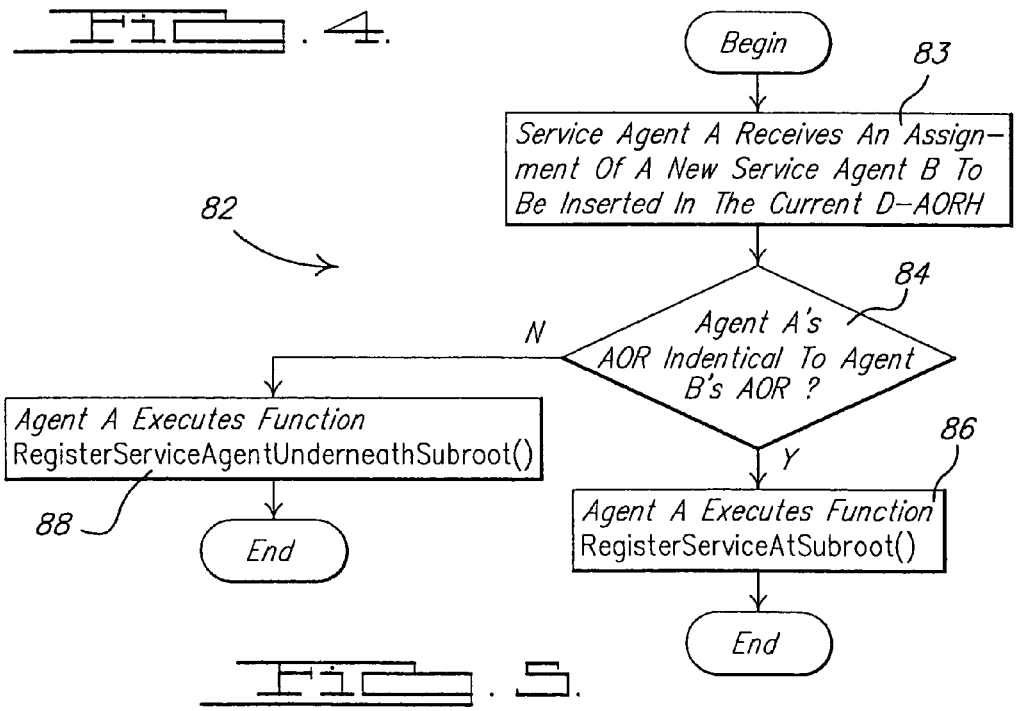
FIG. 5 is a flowchart of the D-AORH Maintenance Algorithm—Insert a New Service Agent used by the Service.
Figure 5A:
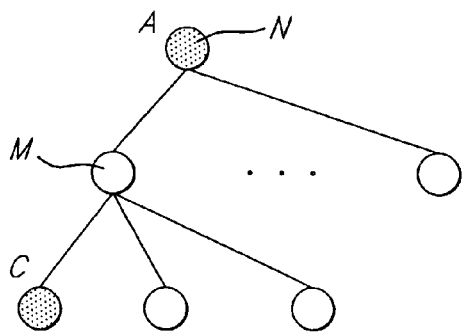
Figure 5B:
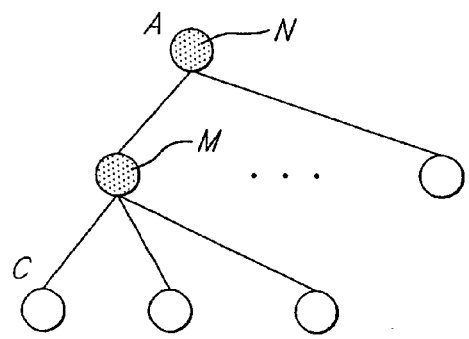
Figure 5C:
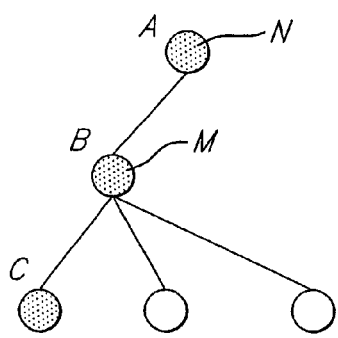
Figure 5D:
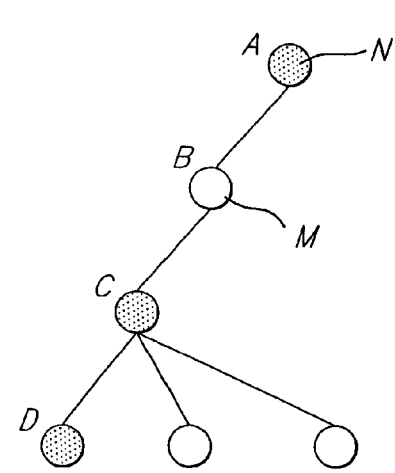
Figure 5E:
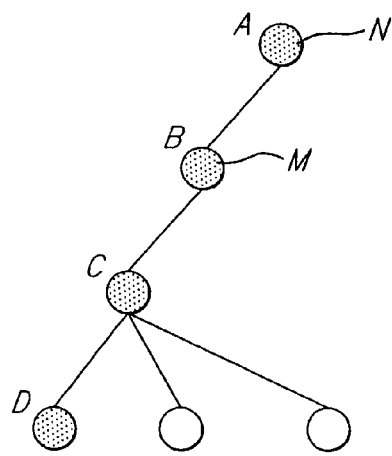

A new service agent may be inserted into the Service at any time. The new service agent can be registered in one of two different ways using the Dynamic AORH Maintenance Algorithm—Insert a New Service Agent, as shown in FIG. 5. If there are other service agents in the current AORH having the same AOR as the new service agent, then the new service agent is registered into AORH through one of these other service agents (they are the new service agent's co-worker agents). Otherwise, the new service agent is registered in the current AORH through one of its direct-parent agents (i.e., one of the first encountered service agents along the new service agent's parent path (from the new service agent's containing node to the root)). The first situation includes the special case that the new service agent is to be registered at the root of AORH, because of one of the requirements for AORH that there is at least one service agent registered at the root. Two major functions, RegisterServiceAgentAtSubRoot( ) and RegisterServiceAgentUnderneathSubRoot( ), described below, are used to implement the insertion of a new service agent in the above two situations, respectively.

Referring to FIG. 5, Dynamic AORH Maintenance Algorithm—Insert a New Service Agent 82 is shown. The process of this algorithm begins with a service agent, say service agent A, receiving an assignment of a new service agent, say new service agent B, to be inserted in the current D-AORH, as indicated in block 83. Agent A's AOR is compared to agent B's AOR, as indicated in block 84. If agent A's AOR is identical to agent B's AOR, then agent A executes function RegisterServiceAgentAtSubRoot( ), as indicated in block 86, and the algorithm ends. If agent A's AOR is not identical to agent B's AOR, then agent A executes function RegisterServiceAgentUnderneathSubRoot( ), as indicated in block 88, and the algorithm ends. These two functions are described below.

Function II

RegisterServiceAgentAtSubRoot( )

In the first situation (identical AORs), function RegisterServiceAgentAtSubRoot( ) is called to insert the new service agent in the current D-AORH. By way of example, we insert a new service agent B and assume that service agent A is one of the service agents in the current AORH having the same AOR as agent B.

Input (2 Parameters)

Two input parameters are used by RegisterServiceAgentAtSubRoot( ). The two input parameters include: (1) the new agent's identification (agent B) to be inserted; and (2) agent A's (B's co-worker agent's) containing node N in agent A's local AORH.

Output updated D-AORH with newly inserted agent B.

Process

The process performed by function RegisterServiceAgentAtSubRoot( ) 90, as shown in FIG. 6, includes the following procedures:

(1) Collect agent A's co-worker agents registered at agent A's containing node N (i.e. SubRoot), as indicated in block 92;

(2) Register agent B at agent A's containing node N, as indicated in block 94;

(3) Inform all of agent A's co-worker agents (not including agent B) to register agent B in their local AORH, by sending a message of type #4 to each of them, as indicated in block 96;

(4) Inform all of agent A's direct-parent agents (if existing) to register agent B in their local AORH, by sending a message of type #4 to each of them, as indicated in block 98;

(5) Inform agent B to build its local AORH by sending a message of type #1 to agent B, as indicated in block 100; and (6) Recursively inform agent A's child agents to register agent B in their local AORH, by sending a message of type #3 to each of agent A's direct-child agents, as indicated in block 102.

Function III

RegisterServiceAgentUnderneathSubRoot( )

In the second situation (differing AORs), function RegisterServiceAgentUnderneathSubRoot( ) is called to insert the new service agent in the current D-AORH. By of example, we insert a new service agent B and assume that service agent A is one of new service agent B's direct-parent agents.

Input (2 Parameters)

Two input parameters are used by RegisterServiceAgentUnderneathSubRoot( ). The two input parameters include: (1) the new agent's identification (agent B) to be inserted; and (2) agent A's (B's direct-parent agent's) containing node N in agent A's local AORH.

Output

Updated D-AORH with newly inserted agent B.

Process

The process performed by function RegisterServiceAgentUnderneathSubRoot( ) 110, as shown in FIG. 7, includes the following procedures:

(1) Create agent B's containing node, say node M, underneath agent A's containing node N in agent A's local AORH, and register agent B at B's containing node M, as indicated in block 112;

(2) Un-register all service agents registered underneath agent B's containing node in agent A's local AORH (These agents are agent B's direct-child agents), as indicated in block 114;

(3) Inform agent B's direct-parent agents (not including agent A) to register agent B and un-register agent B's direct-child agents at their local AORH, by sending a message of type #4 to each of them, as indicated in block 116;

(4) Inform agent B to build its local AORH by sending a message of type #1 to agent B (Note that in this message, the information of agent B's parent-agent list, direct-child-agent list is available. B has no co-worker agent, and the flag recursive is set to be false.), as indicated in block 118; and (5) Recursively inform agent B's child agents to register agent B in their local AORH, by sending a message of type #3 to each of agent B's direct-child agents, as indicated in block 120.

Update D-AORH Among Other Service Agents

Existing service agents take different actions according to the type of message they receive to update the D-AORH. If a service agent receives a message of type #1, it will call function BuildLocalTreeFromAssignmentTable( ), with flag recursive of value false. This is because this service agent is the newly inserted service agent. Its direct-child agents (if existing) have already built their local AORH. If a service agent receives a message of type #3, it will register or un-register (in this case, it will register) the given agent in its local AORH, and then forward the same message to its direct-child agents to inform them to do the same. If a service agent receives a message of type #4, it will take two actions: first, it will register the given agent (to be inserted) in its local AORH; and second, if the given agent does not have existing co-worker agent in AORH, it will un-register the given agent's direct-child agents in its local AORH.

EXAMPLE I

FIGS. 8A-8E show a simplified example of the second situation (adding a new service agent B having an AOR that differs from the AOR of service agent A), where at most one service agent is registered at each node in AORH. The local AORH for agent A, B, C, and D are updated, where new agent B is inserted into AORH through its direct-parent agent A, agent C is B's direct-child agent, and agent D is C's direct-child agent. Agent A's local AORH prior to insertion of new agent B is shown in FIG. 8A. Agent A's local AORH after inserting new agent B into agent A's local AORH is shown in FIG. 8B. New agent B's local AORH is shown in FIG. 8C. Agent C's local AORH prior to insertion of new agent B is shown in FIG. 8D. Agent C's local AORH after inserting new agent B into agent C's local AORH is shown in FIG. 8E.

Dynamic AORH Maintenance Algorithm

Remove an Existing Service Agent

As stated above, the Service may need to update the D-AORH to remove or destroy an existing service agent. A service agent, say agent B, can be removed or destroyed gracefully, i.e., agent B has a chance to inform its direct child agents, its direct parent agents, as well as those service agents registered at agent B's containing node, about its intent to discontinue the service. In response, the Service executes the Dynamic AORH Maintenance Algorithm—Remove an Existing Service Agent. Alternately, service agent B may be destroyed without the opportunity to inform any other service agents of its destruction. This type of destruction can be detected by the Service through the use of a routine contacting procedure. For example, the Service can send out a contact message or "ping" that each service agent is to respond to or have a regular reporting interval for each service agent. In the event that the Service does not receive an appropriate response or report from a service agent (with potentially repeated attempts being made to contact the non-reporting service agent), the Service assumes the non-reporting service agent has been destroyed and executes the Dynamic AORH Maintenance Algorithm—Remove an Existing Service Agent to remove the non-reporting service agent from the D-AORH.

Referring to FIG. 9, Dynamic AORH Maintenance Algorithm—Remove an Existing Service Agent 130 is shown. This algorithm 130 is used to remove a service agent from the D-AORH. Algorithm 130 is explained with reference to removing service agent B. It should be understood that the reference to service agent B is merely for exemplary purposes and that algorithm 130 is used to remove any of the service agents. It is required that there always be at least one service agent registered at the root of the AORH; otherwise, an error will be reported and the Service may be unavailable. Dynamic AORH Maintenance Algorithm—Remove an Existing Service Agent 130 is executed in the following manner:

(1) Collect agent B's co-worker agents registered at agent B's containing node N, as indicated in block 132;

(2) Inform agent B's co-worker agents (if existing) to un-register agent B in their local AORH, by sending a message of type #5 to each of them, as indicated in block 134;

(3) Collect agent B's direct-parent agents registered at agent B's parent path, as indicated in block 136;

(4) Collect agent B's direct-child agents registered in agent B's local AORH, as indicated in block 138;

(5) Check to see if agent B's containing node N is the root of AORH, as indicated in decision block 140;

(6) If agent B's containing node N is not the root of AORH (agent B has a direct-parent agent), then inform agent B's direct-parent agents to take two actions: (i) un-register agent B and (ii) register agent B's direct-child agents in their local AORH, by sending a message of type #5 to each of agent B's direct-parent agents, as indicated in block 142, and then recursively inform agent B's direct-child agents to un-register agent B from their local AORH, by sending a message of type #3 to each of them, as indicated in block 144, and algorithm 130 ends.

(7) If agent B's containing node N is the root of AORH, then a determination of whether another root agent(s) exists is made, as indicated in decision block 146;

(8) If another root agent(s) exists, recursively inform agent B's direct-child agents to un-register agent B from their local AORH, by sending a message of type #3 to each of them, as indicated in block 144, and algorithm 130 ends; and (9) If another root agent(s) does not exist, report an error that no service agent is registered at the root, as indicated in block 148, and algorithm 130 ends.

The service agents (other than the service agent being removed) will take different actions according to the type of message each receives to update the D-AORH. If a service agent receives a message of type #3, it will register or un-register (in this case, it will un-register) the given agent in its local AORH, and then forward the same message to its direct-child agents to inform them to do the same. If a service agent receives a message of type #5, it will take two actions: first, un-register the given agent (agent to be removed) in its local AORH; and second, if no other service agents are registered at the to be removed service agent's containing node, then register the to be removed service agent's direct-child agents in this service agent's local AORH.

The Service is also operable to reassign the AOR of a service agent. To accomplish this, the Service first removes the service agent to be reassigned with the Dynamic AORH Maintenance Algorithm—Remove an Existing Service Agent 130, discussed above. Once the service agent to be reassigned has been removed from the AORH, the Service uses the Dynamic AORH Maintenance Algorithm—Insert a New Service Agent 82, discussed above, to reinsert the service agent with the new AOR. Thus, by using algorithms 130 and 82, the Service can reassign the AOR of an existing service agent.

Distributed Publication Algorithm

As stated above, the Service can provide publication services. The Distributed Publication Algorithm provides a distributed publication service to: (1) register a given publisher (an agent that provides information, such as a sensor agent) at those service agents whose AORs directly intersect (not through other service agent's AOR) with the geometric entity (or AOC) provided by the publisher; and (2) mark all nodes in these service agents' local AORH that have intersection with the given geometric entity (GE). The presentation of the given GEs is not constrained in the Distributed Publication Algorithm. It is preferred, however, to use a simple geometric language to describe such regions of space, such as spheres, cones, cylinders, frustums, or cubes.

The depth of the AORH tree in the Service is limited to provide spatial query efficiency. As a result, the size of a leaf node in the D-AORH is determined by the pre-defined depth, and it defines the finest intersection unit that can be detected in the Service's spatial query capabilities. The Service sets two different markers at each node that has intersection with the given GE: SENSED and INTERSECTED. SENSED normally indicates that this node's corresponding space of volume in the agent environment is fully covered by the given AOC; while INTERSECTED indicates that this node's space of volume is partially covered by the given AOC. In particular, if a leaf node of D-AORH intersects with a given GE, it is marked as SENSED, because the detect accuracy cannot go beyond this resolution. Furthermore, if all the eight child nodes of a parent node are SENSED nodes, the parent node is marked as a SENSED node. If at least one of its child nodes is an INTERSECTED node, then that parent node is marked as an INTERSECTED node. One goal of the Distributed Publication Algorithm is to mark each node in a local AORH as a SENSED node or INTERSECTED node, if it is fully or partially covered by the given AOC.

The basic idea of the Distributed Publication Algorithm is to find a service agent, say agent R, who's AOR fully contains the given GE. If more than one service agent registered at the same node meets the requirement, an optimal one is chosen from them by considering, for example, their current load for a better load balancing of the Service. The sensor (publishing) agent sends a publication request to agent R. Through agent R and its child service agents, all nodes in D-AORH that intersect with the given GE are detected. The sensor agent is registered at those service agents who's AOR directly cover these leaf nodes, not through other service agents. A detailed description of the Distributed Publication Algorithm is given below.

Figure 10:
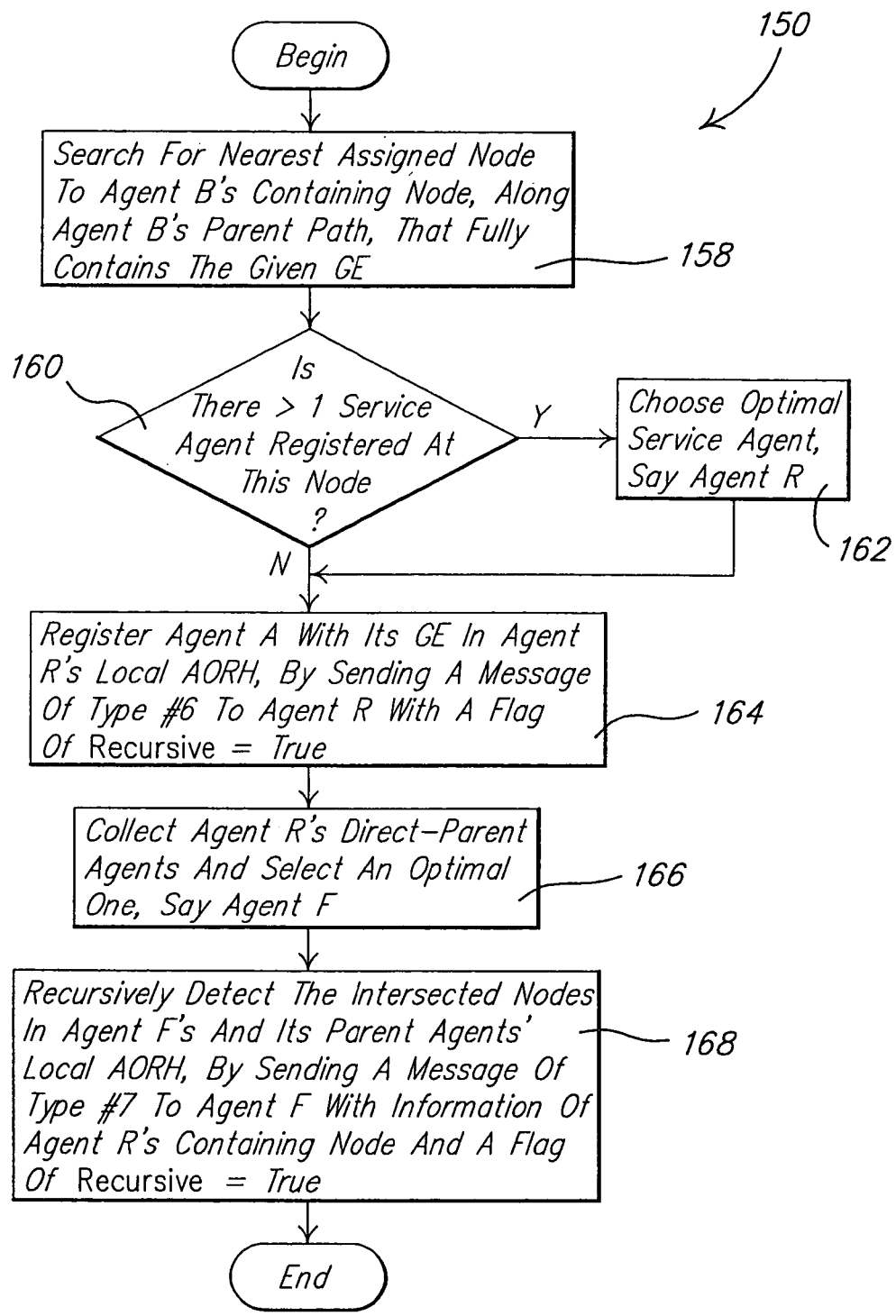
FIG. 10 is a flowchart of the Distributed Publication Algorithm used by the Service.

Referring to FIG. 10, Distributed Publication Algorithm 150 is shown. When describing algorithm 150, the sensor agent (publisher) is taken to be agent A and is to be registered in D-AORH with a given GE. A service agent B is taken as agent A, if A is also a service agent; otherwise, B is taken as the root agent stored at agent A. The Distributed Publication Algorithm 150 starts from agent B and executes the following procedures:

(1) Search for the nearest assigned node to agent B's containing node, along agents B's parent path, that fully contains the given GE, as indicated in block 158 (Such a search will always be successful because, in the worst case, the resultant node would be the root of D-AORH.);

(2) Determine if there are more than one (1) service agent at this node, as indicated in decision block 160, and, if so, collect all service agents registered at this node and find an optimal one, say agent R, among them, as indicated in block 162 (There can be different criteria in choosing an optimal service agent. For example, the agent with the smallest load can be selected for a better load balancing. There is mechanism to calculate the processing load of service agents, by periodically translating their load to their parent agents, child agents, and co-worker agents.);

(3) Register agent A with its GE in agent R's local AORH, by sending a message of type #6 with a flag of recursive=true, as indicated in block 164;

(4) Collect agent R's direct-parent agents and select an optimal one, say agent F, as indicated in block 166 (There can be different criteria in choosing an optimal service agent. For example, the agent with the smallest load can be selected for a better load balancing.); and (5) Recursively detect the intersected nodes in agent F's and its parent agent's local AORH, by sending a message of type #7 to agent F with the information of agent R's containing node N, the sensor agent (publisher) A, and a flag of recursive=true, as indicated in block 168.

Figure 11:
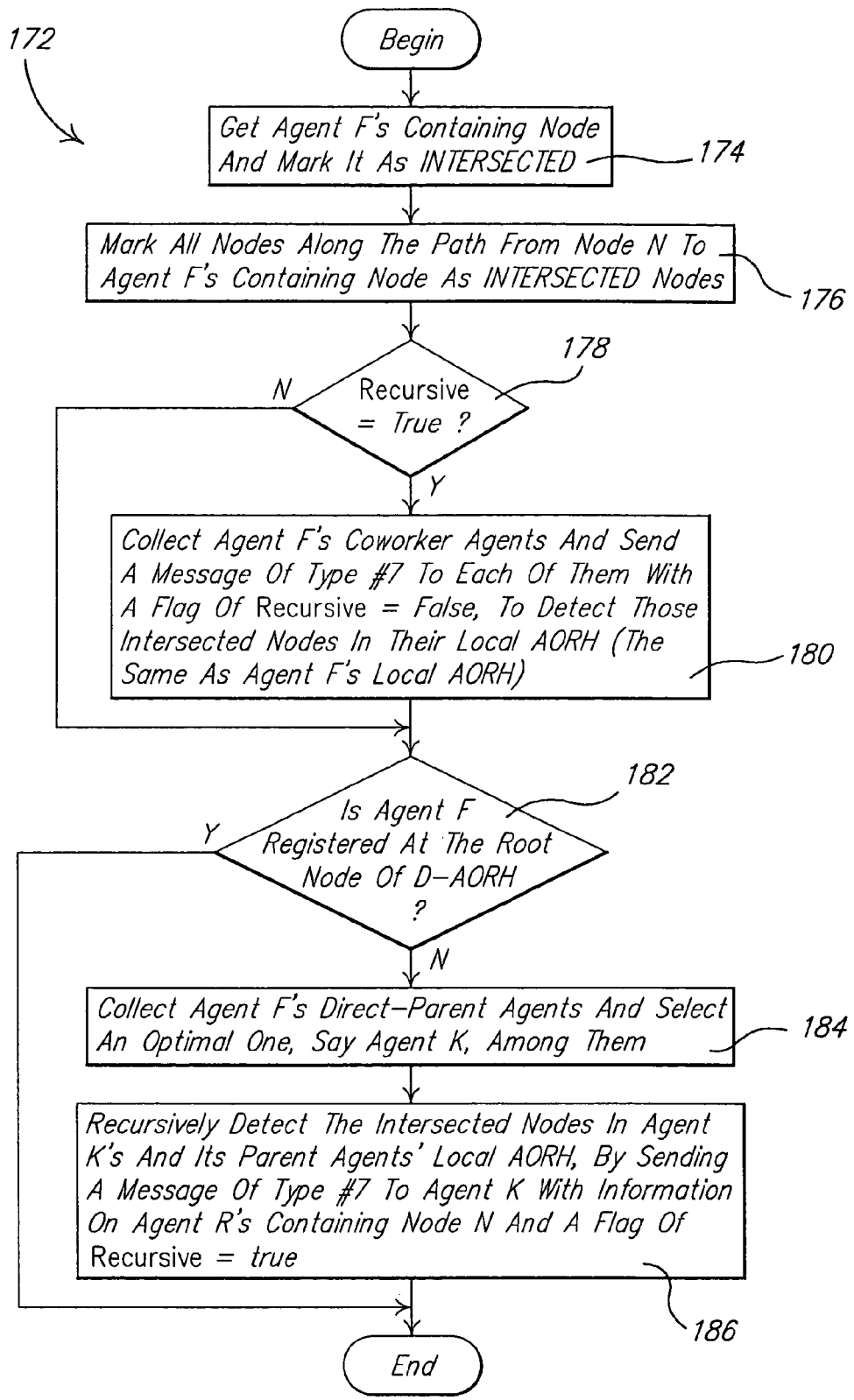
FIG. 11 is a flowchart of the Message Type #7 Algorithm used by the Service.

During execution of Distributed Publication Algorithm 150 a service agent, say agent F, receives a message of type #7 to recursively detect the intersected nodes in agent F's and its parent agent's local AORH. To accomplish this, a Message Type #7 Algorithm 172, shown in FIG. 11, is utilized. Message of type #7 also comes with information of the selected service agent's, say agent R's, containing node, say node N, the given agent A (publisher), and a flag of recursive=true or false. Algorithm 172 executes the following procedures:

(1) Get agent F's containing node and mark it as INTERSECTED (because one of its child nodes, the given node N in the message, is intersected with the given AOR), as indicated in block 174;

(2) Mark all the nodes along the path from node N to agent F's containing node as INTERSECTED nodes of agent A, as indicated in block 176;

(3) Determine if recursive=true, as indicated in decision block 178, and, if recursive=true, then collect agent F's co-worker agents and send a message of type #7 to each of them, with a flag of recursive=false, to detect those intersected nodes in their local AORH (the same as agent F's local AORH), as indicated in block 180;

(4) Determine if agent F is registered at the root node of D-AORH, as indicated in decision block 182, and, if not, then collect agent F's direct-parent agents and select an optimal one, say agent K, among them, as indicated in block 184, and then recursively detect the intersected nodes in agent K's and its parent agents' local AORH, by sending a message of type #7 to agent K with the information of agent R's containing node N and a flag of recursive=true, as indicated in block 186.

EXAMPLE II

Figure 12A:
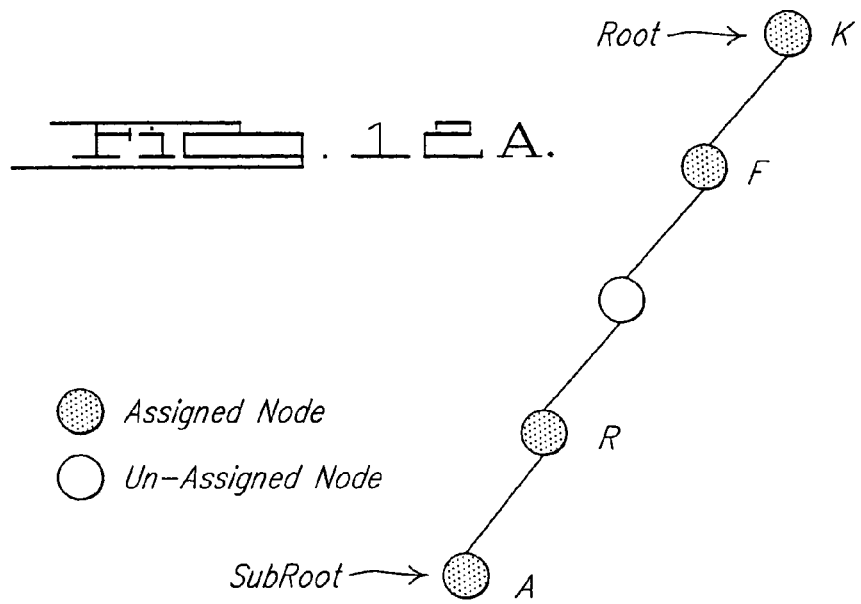
FIGS. 12A-12C are exemplary schematic representations of the marking of intersected nodes in a parent agent's local area of responsibility hierarchy as done by the Service.
Figure 12B:
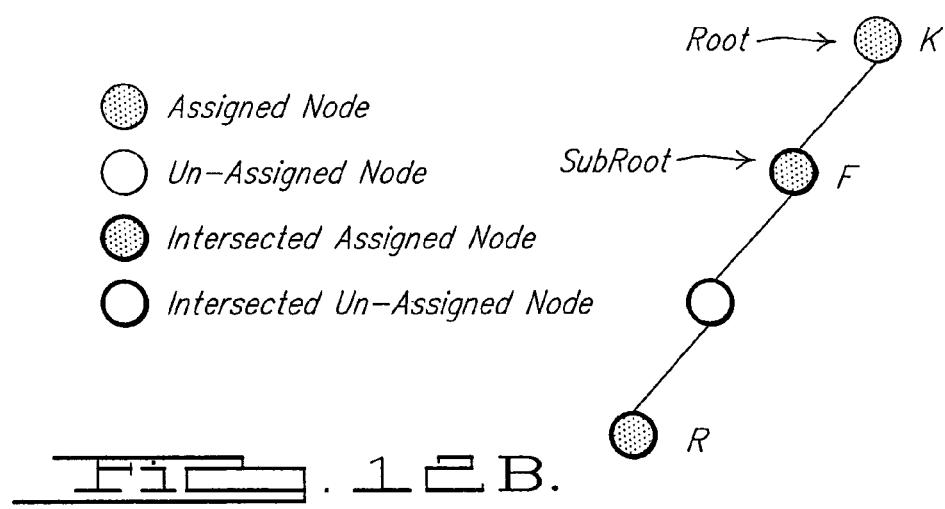
Figure 12C:
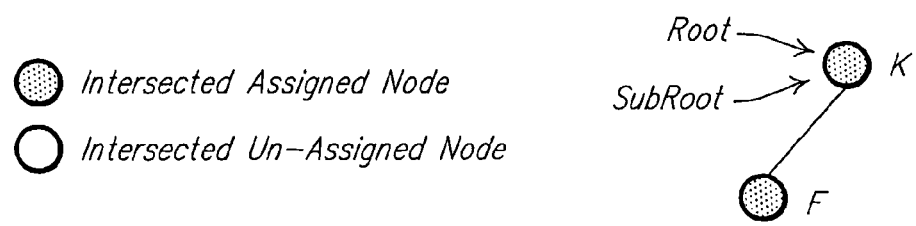

FIGS. 12A-12C show a simplified example where the given sensor agent (publisher) A is also a service agent, service agent F is a direct-parent agent of agent R, and agent K is a direct-parent agent of agent F. The example shows the parent path of sensor/service agent A's local AORH (FIG. 12A), and the marked INTERSECTED nodes (in thick circles) in agent F and K's local AORH (FIGS. 12B and 12C, respectively), upon receiving a message of type #7.

Figure 13:
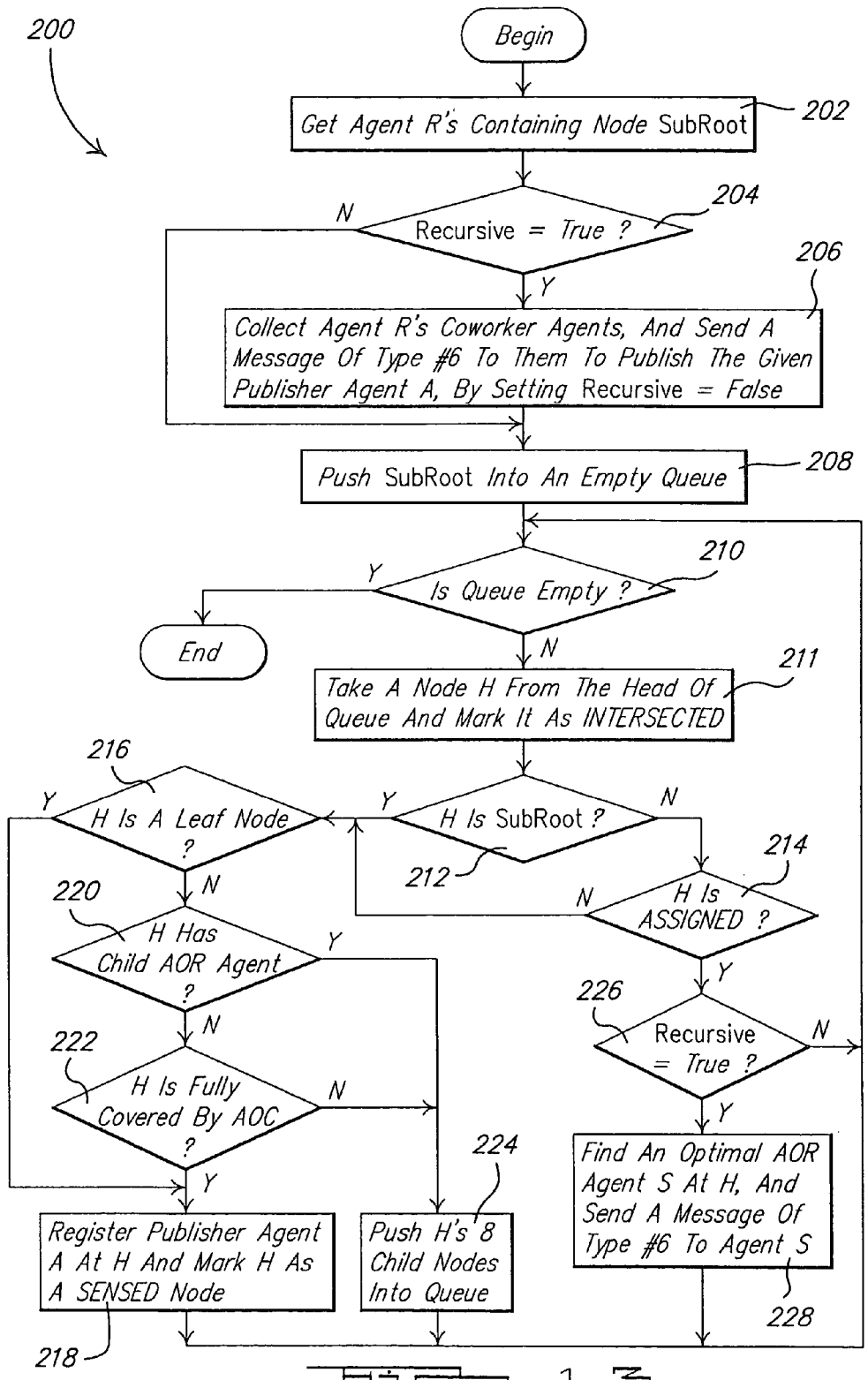
FIG. 13 is a flowchart of the Message Type #6 Algorithm used by the Service.

During execution of Distributed Publication Algorithm 150, a service agent, such as agent R, receives a message of type #6 to register a sensor agent (a publisher agent in this case), such as agent A, along with its GE in agent R's local AORH. To accomplish this, a Message Type #6 Algorithm 200, shown in FIG. 13, is utilized. Message of type #6 comes with the given sensor agent A and a flag of recursive=true or false. Algorithm 200 executes the following procedures:

(1) Get agent R's containing node SubRoot, as indicated in block 202;

(2) Determine if recursive=true, as indicated in decision block 204, and if true then collect agent R's co-worker agents and send a message of type #6 to each of them to register the given sensor agent (publisher) A in their local AORH, with a flag of recursive=false (to avoid duplicated work on these co-worker agents), as indicated in block 206;

(3) Define a queue to recursively detect all the nodes in agent R's local AORH that intersect with the given GE. This queue is initially empty. Each time, a node is added at the tail of this queue or a node is obtained from the head of the queue. Initially, add (push) SubRoot at the tail of the empty queue, as indicated in block 208;

(4) While the queue is not empty, perform, as dictated by decision block 210, the following:

(i) Take a node, say node H, from the head of the queue and mark it as an INTERSECTED node of agent A, as indicated in block 211;

(ii) Determine if node H is SubRoot, as indicated in decision block 212. If node H is SubRoot or it is not an assigned node (or say, no service agent registered at this node), as determined in decision block 214, then different actions are taken in three different situations: first, if node H is a leaf node of D-AORH, as determined in decision block 216, then mark H as a SENSED node of agent A and register agent A at node H, as indicated in block 218, and determine if the queue is empty, as indicated in decision block 210; second, if node H has no child service agent(s) (in this case, node H is a leaf node of agent R's local AORH), as determined in decision block 220, and node H's space of volume is fully covered by the given GE, as determined in decision block 22, then mark H as a SENSED node of agent A and register agent A at node H, as indicated in block 218, and determine if the queue is empty, as indicated in decision block 210; third, otherwise, add node H's eight child nodes into the queue, as indicated in block 224, and determine if the queue is empty, as indicated in decision block 210; and (iii) If node H is not SubRoot, as determined in decision block 212 and node H is an assigned node, as determined in decision block 214, and recursive=true, as determined in decision block 226, then collect all service agents registered at node H, find an optimal one, say agent S, among them if more than one agent is available, and send a message of type #6 to agent S to register sensor agent A in agent S's local AORH, with a flag of recursive=true, as indicated in block 228, and determine if the queue is empty, as indicated in decision block 210; and (1) When the queue is empty, as determined in decision block 210, algorithm 200 ends.

Distributed Snapshot-Query Algorithm

The Service uses a Distributed Snapshot-Query Algorithm to provide a distributed "snapshot" query service issued from a consumer agent (an information consumer). The Distributed Snapshot-Query Algorithm provides the snapshot service by detecting all sensor agents (publishers) registered in AORH, whose GE (or AOC) intersect with the given consumer agent's GE (or AOI), and reporting the IDs of these sensor agents (publishers) to the subscribing consumer agent. Specifically, the Distributed Snapshot-Query Algorithm detects all the SENSED nodes that intersect with the given consumer agent's GE (or AOI), and collects the sensor agents (publishers) registered at these SENSED nodes.

The basic operation of Distributed Snapshot-Query Algorithm performs three procedures. First, the consumer agent finds a service agent, say agent R, who's AOR fully contains the given consumer agent's GE (or AOI). If more than one service agent registered at the same node meets the requirement, an optimal one is chosen from them by considering, for example, their current load for a better load balancing on the Service. Second, the consumer agent sends a query request to agent R. Third, through agent R and its child service agents, detect all the SENSED nodes in D-AORH that intersect with the given consumer agent's GE (or AIO), and then collect all sensor agents (publishers) registered at these SENSED nodes and send their IDs to the consumer agent.

Figure 14:
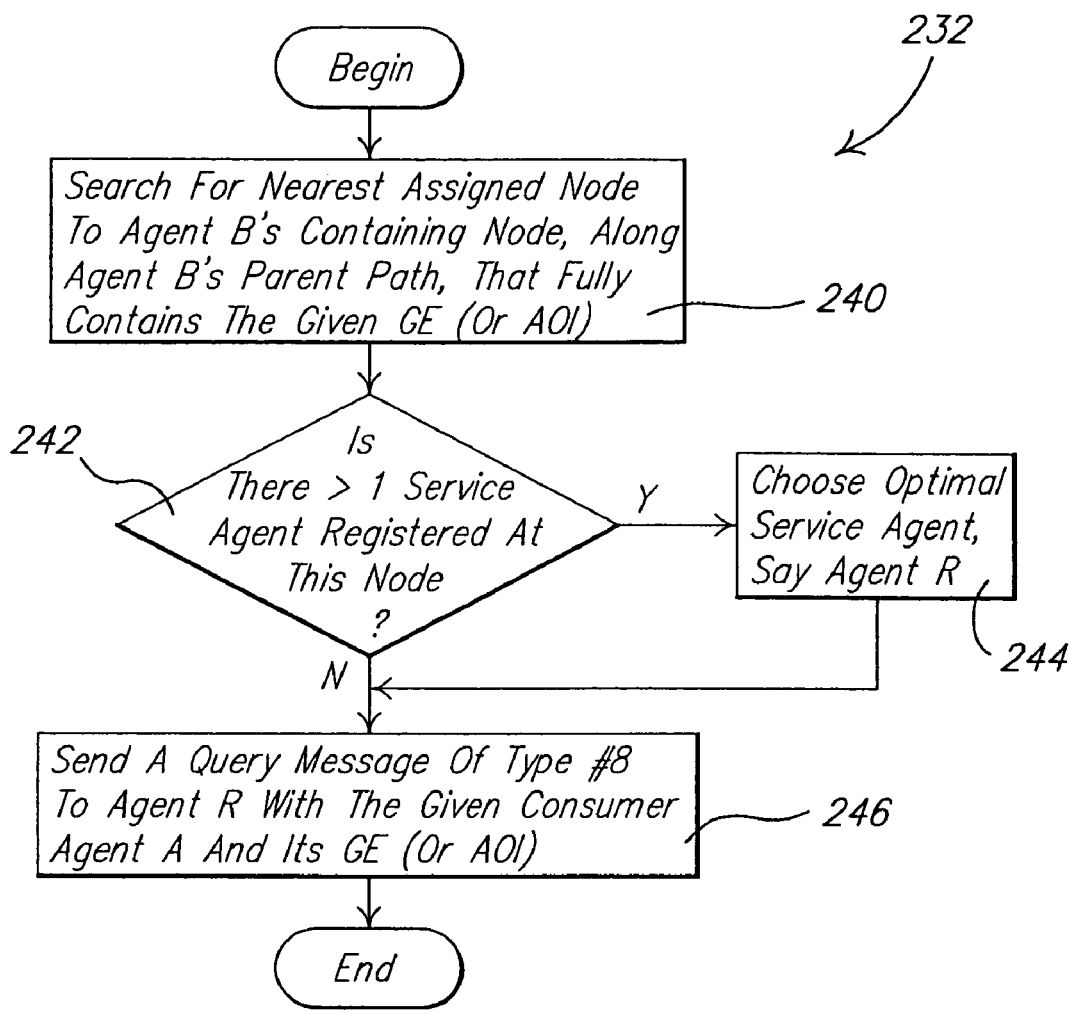
FIG. 14 is a flowchart of the Distributed Snapshot-Query Algorithm used by the Service.

Referring to FIG. 14, Distributed Snapshot-Query Algorithm 232 is shown. When describing algorithm 232, the consumer agent (subscriber) is taken to be agent A having a given GE (or AOI). A service agent B is taken as agent A, if A is also a service agent; otherwise, B is taken as the root agent stored at agent A. The Distributed Snapshot-Query Algorithm 232 starts from agent B and executes the following procedures:

(1) Search for the nearest assigned node to agent B's containing node, along agents B's parent path, that fully contains the given GE (or AOI), as indicated in block 240 (Such a search will always be successful because, in the worst case, the resultant node would be the root of D-AORH.);

(2) Determine if there are more than one (1) service agents at this node, as indicated in decision block 242, and, if so, collect all service agents registered at this node and find an optimal one, say agent R, among them, as indicated in block 244 (There can be different criteria in choosing an optimal service agent. For example, the service agent with the smallest load can be selected for better load balancing.); and (3) Send a query message of type #8 to agent R with the given consumer agent A and its GE (or AOI), as indicated in block 246.

Query Algorithm on an AOR Agent R that Receives a Query Message of Type #8

Figure 15:
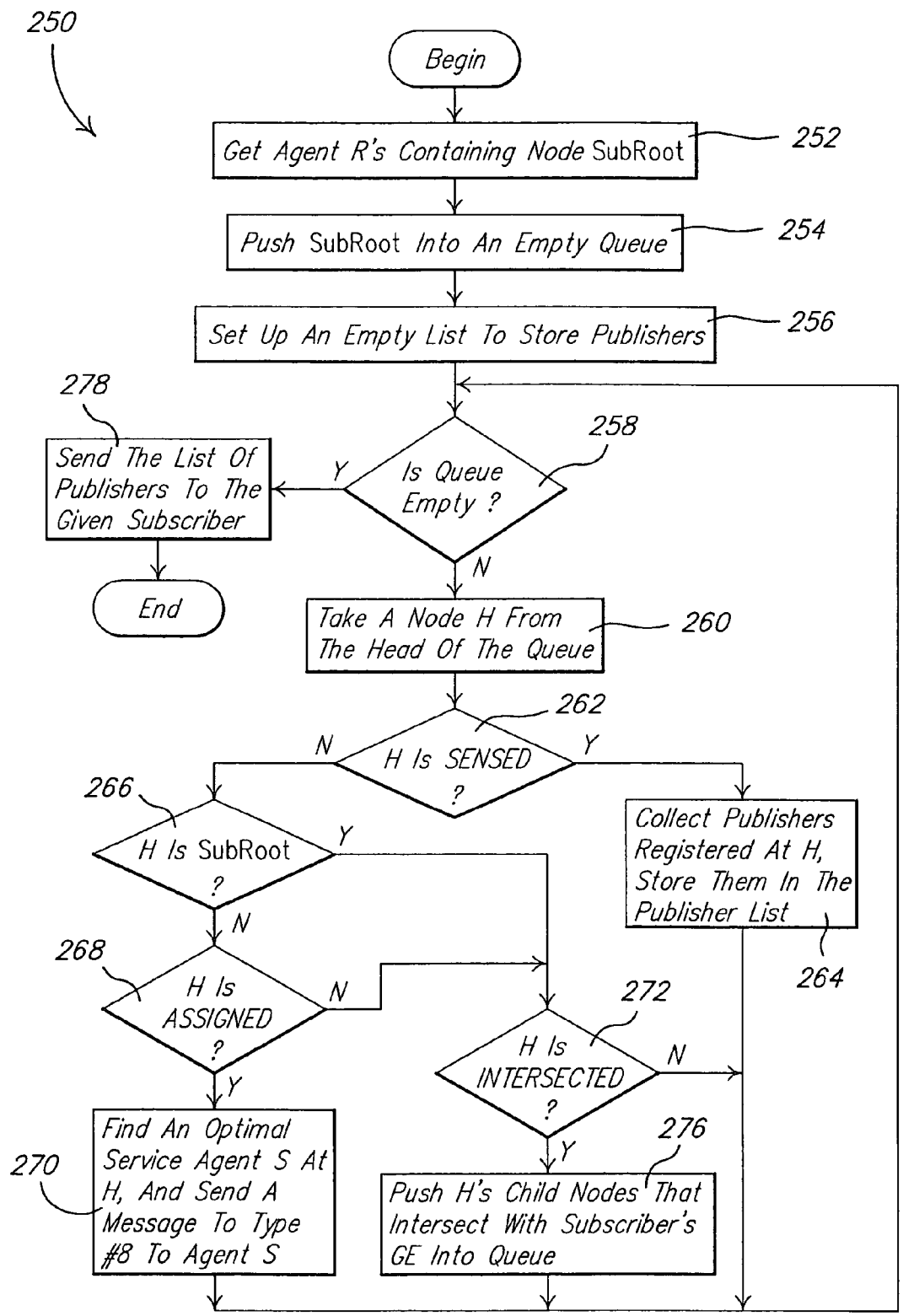
FIG. 15 is a flowchart of the Message Type #8 Algorithm used by the Service.
Figure 15:
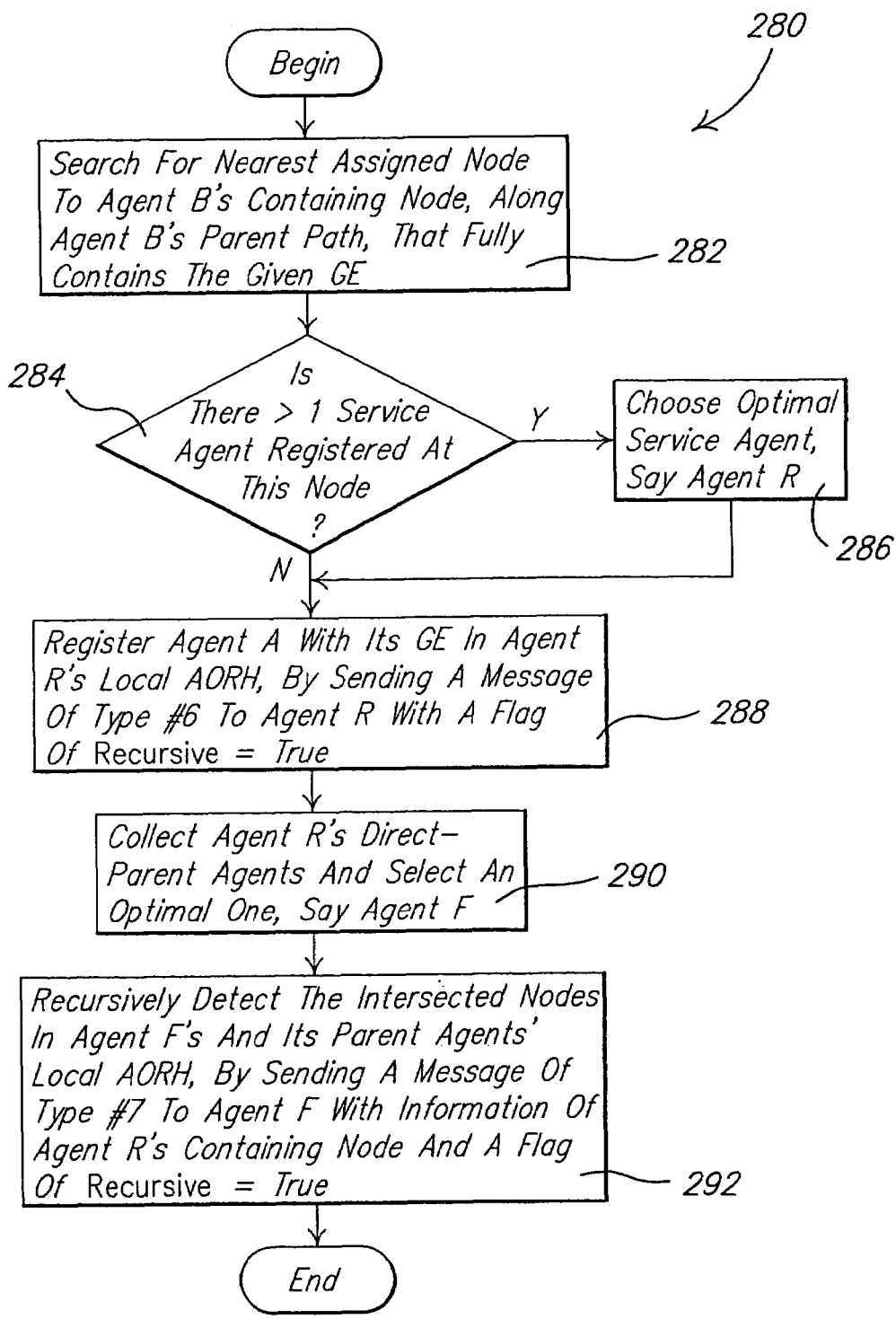

During execution of Distributed Snapshot-Query Algorithm 232 a service agent, say agent R, receives a query message of type #8 to supply the subscribing consumer agent, say agent A, with a list of sensor agents (publishers) with relevant information. To accomplish this, a Message Type #8 Algorithm 250, shown in FIG. 15, is utilized. Message of type #8 comes with the given consumer agent (agent A) and its GE (or AOI). Algorithm 250 executes the following procedures:

(1) Get agent R's containing node SubRoot, as indicated in block 252;

(2) Define a queue to recursively detect all SENSED nodes in agent R's local AORH that intersects with the given GE (or AOI). This queue is initially empty. Each time, a node is added at the tail of this queue or obtained from the head of the queue. (This is the same queue used in the message of type #6 algorithm 200 shown in FIG. 13.) Initially, add (push)Sub-Root at the tail of the empty queue, as indicated in block 254;

(3) Set up an empty list to store sensor agents (publishers), as indicated in block 256;

(4) While the queue is not empty, perform, as dictated by decision block 258, the following:

(i) Take a node, say node H, from the head of the queue, as indicated in block 260;

(ii) If node H is a SENSED node, as determined in decision block 262, then collect all sensor agents (publishers) registered at node H and add them into the sensor agent list (This list contains all the sensor agents (publishers) whose GE (or AOC) intersects with the given consumer agent's GE (or AOI). It is initially empty.), as indicated in block 264, then determine if the queue is empty, as indicated in decision block 258;

(iii) If node H is not a SENSED node, as determined in decision block 262, and node H is not SubRoot, as determined in decision block 266, and node H is an assigned node, as determined in decision block 268, then collect all service agents registered at node H and, if more than one service agent is available, find an optimal agent, say agent S, among them and send a query message of type #8 to agent S with consumer agent A and its GE (of AOI), as indicated in block 270, then determine if the queue is empty, as indicated in decision block 258;

(iv) If node H is not a SENSED node, as determined in decision block 262, and node H is not SubRoot, as determined in decision block 266, and node H is not an assigned node, as determined in decision block 268, and node H is an INTERSECTED node, as determined in decision block 272, then add (push) node H's child nodes, which intersect with the given subscriber's GE, into the queue, as indicated in block 276, then determine if the queue is empty, as indicated in decision block 258;

(v) If node H is not a SENSED node, as determined in decision block 262, and node H is SubRoot, as determined in decision block 266, and node H is an INTERSECTED node, as determined in decision block 272, then add (push) node H's eight child nodes into the r, as indicated in block 276, then determine if the queue is empty, as indicated in decision block 258; and (vi) If node H is not a SENSED node, as determined in decision block 262, and node H is SubRoot, as determined in decision block 266, and node H is not an INTERSECTED node, as determined in decision block 272, then determine if the queue is empty, as indicated in decision block 258; and (5) When the queue is empty, as determined in decision block 258, send a message to consumer agent A, with the sensor list, as indicated in block 278, then end message type #8 algorithm 250.

Distributed Subscription Algorithm

The Service uses a Distributed Subscription Algorithm to provide a distributed subscription service. This distributed subscription service provides proactive information to a subscribing consumer agent.

The basic operation of the Distributed Subscription Algorithm performs two procedures. First, if the subscribing consumer agent has not been registered to AORH or the subscribing consumer agent's GE (or AOI) changes, the Service automatically executes a Distributed Consumer Registration Algorithm. Second, at each AOR agent where the subscriber is registered, the Service executes a Distributed Consumer Subscription algorithm to detect all the SENSED nodes that intersect with the given subscriber's GE, collect the publishers registered at these SENSED nodes, and report the publishers to the given subscriber.

Note that the subscriber will be responsible for terminating the data feed at a subsequent time (This is due to the update of the subscriber's geometric entity when the agent moves).

Distributed Consumer Registration Algorithm

Referring to FIG. 16, Distributed Consumer Registration Algorithm 280 is shown. When describing Distributed Consumer Registration Algorithm 280, the consumer agent is taken to be agent A and is to be registered in D-AORH with a given GE (or AOI). A service agent B is taken as agent A, if A is also a service agent; otherwise, B is taken as the root agent stored at agent A. The Distributed Consumer Registration Algorithm 280 starts from service agent B and executes the following procedures:

(1) Search for the nearest assigned node to agent B's containing node, along agents B's parent path, that fully contains the given GE, as indicated in block 282 (Such a search will always be successful because, in the worst case, the resultant node would be the root of D-AORH.);

(2) Determine if there are more than one (1) service agent at this node, as indicated in decision block 284, and, if so, collect all service agents registered at this node and find an optimal one, say agent R, among them, as indicated in block 286 (There can be different criteria in choosing an optimal service agent. For example, the agent with the smallest load can be selected for a better load balancing.);

(3) Register agent A with its GE in agent R's local AORH, by sending a message of type #6 to agent R with a flag of recursive=true, as indicated in block 288;

(4) Collect agent R's direct-parent agents and select an optimal one, say agent F, as indicated in block 290 (There can be different criteria in choosing an optimal service agent. For example, the agent with the smallest load can be selected for a better load balancing.); and (5) Recursively detect the intersected nodes in agent F's and its parent agent's local AORH, by sending a message of type #7 to agent F with the information of agent R's containing node N, the given consumer agent A, and a flag of recursive=true, as indicated in block 292.

During execution of Distributed Consumer Registration Algorithm 280 a service agent, say agent F, receives a message of type #7 to recursively detect the intersected nodes in agent F's and its parent agent's local AORH. To accomplish this, a Message Type #7 Algorithm 172, shown before in FIG. 11, is utilized. Message of type #7 also comes with information of the selected service agent's, say agent R's, containing node, say node N, the given consumer agent A, and a flag of recursive=true or false.

During execution of Distributed Consumer Registration Algorithm 280, a service agent, such as agent R, receives a message of type #6 to register a given consumer agent A, along with its GE in agent R's local AORH. To accomplish this, a Message Type #6 Algorithm 200, shown before in FIG. 13, is utilized. Message of type #6 comes with the given consumer agent A and a flag of recursive=true or false.

Figure 17:
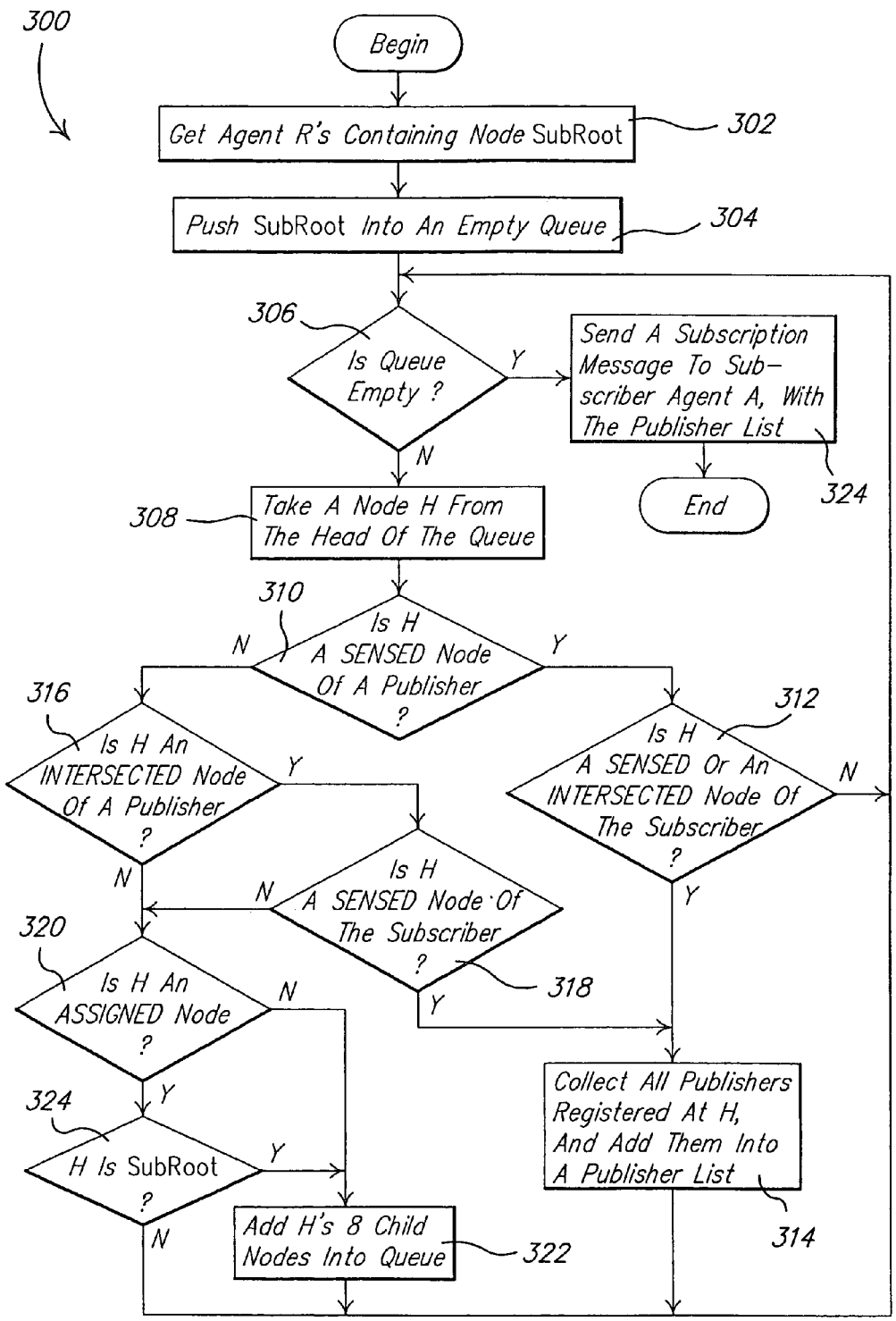
FIG. 17 is a flow chart of the Distributed Consumer Subscription Algorithm used by the Service.

Consumer Subscription Algorithm on Each AORH Agent R where the Subscriber is Registered Referring to FIG. 17, Distributed Consumer Subscription Algorithm 300 is shown. Distributed Consumer Subscription Algorithm 300 executes the following procedures:

(1) Get the current service agent R's containing node SubRoot, as indicated in block 302;

(2) Define a queue to recursively detect all SENSED nodes in agent R's local AORH that intersects with the registered subscriber's GE. This queue is initially empty. Each time, we add a node at the tail of this queue or obtain a node from the head of the queue. (This is the same queue used in the Distributed Publication Algorithm 150, described above.) Initially, add (push) SubRoot at the tail of the empty queue, as indicated in block 304;

(3)

(4) While the queue is not empty, perform, as indicated by decision block 306, the following:

(i) Take a node, say node H, from the head of the queue, as indicated in block 308;

(ii) Determine if node H is a SENSED node of a publisher, as determined in decision block 310;

(iii) If node H is a SENSED node of a publisher, then take the following two actions: first, if H is a SENSED or an INTERSECTED node of the subscriber, as determined in decision block 312, collect all publishers registered at H and add them into a publisher list (This list contains all the publishers whose geometric entity intersected with the given subscriber's GE. It is initially empty.), as indicated in block 314; second, determine if the queue is empty, as indicated in decision block 306;

(iv) If node H is not a SENSED node of a publisher, then determine if H is an INTERSECTED node of a publisher, as indicated in decision block 316. If node H is a INTERSECTED node of a publisher, and if H is a SENSED node of the subscriber, as determined in decision block 318, then collect all publishers registered at H and add them into a publisher list, as indicated in block 314, and determine if the queue is empty, as indicated in decision block 306; and (v) If node H is not a SENSED node of a publisher, as determined in decision block 310, and either (a) H is an INTERSECTED node of a publisher and H is a SENSED node of the subscriber, as determined in decision blocks 316 and 318 or (b) H is not an INTERSECTED node of a publisher, as determined in decision block 316, then determine if node H is an ASSIGNED node, as indicated in decision block 320. If node H is not an ASSIGNED node or if H is SubRoot, as determined in decision block 324, then add node H's eight child nodes into the queue, as indicated in block 322 then determine if the queue is empty, as indicated in decision block 306. If node H is an ASSIGNED node and if H is not SubRoot, as determined in decision blocks 320 and 324, then determine if the queue is empty, as indicated in decision block 306;

(5) When queue is empty, as determined in decision block 306, send a subscription message to subscriber A, with the publisher list, as indicated in decision block 324.

Thus, the Service, by using the above procedures and executing the above algorithms and functions advantageously solves a number of technical problems heretofore unsolved. Specifically, the problems solved by the Service, according to the principles of the present invention, is at least three fold. The first is that of distributing and synchronizing the descriptions of time varying three dimensional geometric entities on multiple computing platforms. The second is to provide a mechanism by which a platform (agent) may register itself as a provider or consumer of information for either an existing geometric entity or one that results from an operation involving existing geometric entities. The third is to provide a mechanism by which a platform (agent) may execute operations involving the above geometric entities.

Specifically, distribution of time varying three dimensional geometric entities on multiple computing platforms (service agents) is accomplished through the use of a distributed octree based location service. This service is distributed. It is provided by a number of service agents, each of which is responsible for a region in the agent environment—the AOR. These AORs are organized into an octree-based spatial hierarchy (AORH) which is distributed among these service agents. This service is also resilient. In the event an existing service agent is removed or inserted, the Service will reassign the nodes of the AORH to its service agents in a distributed manner.

Registration of a platform (agent) itself as a provider or consumer of information for either an existing geometric entity or one that results from an operation involving existing geometric entities is implemented by publishing or subscribing a given geometric entity on the distributed AORH among service agents. Specifically, the consumer agent in this platform sends the proper message to a known point of contact service agent, for example the one at the top of the hierarchy. Then, the service agents who's AORs contain or intersect the given geometric entity will register the consumer agent at the intersected nodes in the AORH in a distributed manner. For example, sensor platforms register their area of coverage with AORH, while consumer agents' subscribe to AORH by providing their area of interest (AOI).

While the present invention is described with reference to specific embodiments, those skilled in the art will recognize modifications or variations which might be made without departing from the inventive concept. Additionally the examples herein illustrate the invention and are used to facilitate understanding of the invention and should not be construed as limiting the present invention. While operations involving the geometric entities registered in AORH are currently limited to intersection operations in order to support the discovery of sensor agents which cover a given area of interest in the present embodiment of the Service, it should be appreciated that the notion of intersection in this scenario may be extended to include other geometric operations as they are required. It should also be appreciated that while the Service is disclosed as using octal encoding, alternative coding schemes can be employed. Therefore, the description and claims should be interpreted liberally with only such limitation as is necessary in view of the pertinent prior art.

What is claimed is:

1. A method of matching a publishing agent's area of coverage with a subscribing agent's area of interest using a distributed tempero-spatial query service, the method comprising:
   (a) assigning areas of responsibility (AORs) to a plurality of service agents, the AORs corresponding to three-dimensional volumes of space;
   (b) organizing the service agents into a spatial hierarchy (AORH) based upon each service agent's AOR;
   (c) distributing and hosting the spatial hierarchy on each of the service agents;
   (d) matching a request from a subscribing agent with a publishing agent based upon spatial attributes; and
   wherein (b) includes defining a local AORH stored at each service agent by:
   (i) a service agent's containing node that corresponds to the service agent's AOR;
   (ii) a parent oath from the service agent's containing node to a root of the AORH; and
   (iii) a subtree rooted at the service agent's containing node and ending at a first-encountered contained node of another AOR along each branch of the spatial hierarchy.

2. The method of claim 1, wherein (b) includes organizing the service agents into a tree-based spatial hierarchy.

3. The method of claim 2, wherein (b) includes organizing the service agents into an octree-based spatial hierarchy and representing each node of the spatial hierarchy that corresponds to a particular one of the service agent's AOR by octal encoding.

4. The method of claim 1, wherein (c) includes generating a distributed AORH among the service agents.

5. The method of claim 4, wherein generating the distributed AORH among the service agents includes generating a local AORH at a root service agent who's AOR covers an entire agent environment and generating a local AORH at service agents that are coworker agents with the root service agent and whose AOR's are identical to the root agent's AOR.

6. The method of claim 5, wherein generating the local AORH at the service agent includes:
   (i) generating the service agent's parent path by generating a node path from the service agent's containing node towards a root of the AORH and then registering the service agent's parent agents at their containing node in that path;
   (ii) registering the service agent's coworker agents at the service agent's containing node;
   (iii) collecting the service agent's direct-child agents from a set of the service agent's child agents; and
   (iv) registering each of the direct-child agents at its containing node by generating a node path from the service agent's containing node to the direct-child agent's containing node and registering the direct-child agent and its coworker agents at the direct-child agent's containing node.

7. The method of claim 1, further comprising dynamically maintaining the distributed AORH to account for insertion of new service agents and removal of existing service agents.

8. The method of claim 7, wherein insertion of a new service agent and removal of an existing service agent is done in a distributed manner by the service agents.

9. The method of claim 1, further comprising responding to a subscribing agent's query through the distributed AORH in a distributed manner.

10. The method of claim 9, wherein responding to the subscribing agent's query through the distributed AORH in the distributed manner includes searching along a parent path in a local AORH to find a nearest registered service agent whose AOR fully contains the subscribing agent's area of interest (AOI) and recursively detecting all sensed nodes in that service agent's local AORH that intersect with the subscribing agent's AOI.

11. The method of claim 1, further comprising registering a new subscribing agent's area of interest in the distributed AORH in a distributed manner.

12. The method of claim 1, further comprising registering a new publishing agent's area of coverage in the distributed AORH in a distributed manner.

13. The method of claim 1, further comprising processing requests from multiple subscribing agents in parallel on the service agents.

14. The method of claim 1, wherein (d) includes matching the subscribing agent's request with the publishing agent based upon spatial attributes of the subscribing agent's area of interest and the publishing agent's area of coverage.

* * * * *

UNITED STATES PATENT AND TRADEMARK OFFICE
CERTIFICATE OF CORRECTION

PATENT NO. : 7,616,590 B2
APPLICATION NO. : 11/191625
DATED : November 10, 2009
INVENTOR(S) : Wan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1139 days.

Signed and Sealed this

Nineteenth Day of October, 2010

David J. Kappos
*Director of the United States Patent and Trademark Office*